United States Patent
Takaishi

(10) Patent No.: US 7,609,474 B2
(45) Date of Patent: Oct. 27, 2009

(54) SEEK CONTROL METHOD, SEEK CONTROL DEVICE AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 11/517,032

(22) Filed: Sep. 7, 2006

(65) Prior Publication Data

US 2007/0253098 A1    Nov. 1, 2007

(30) Foreign Application Priority Data

Apr. 26, 2006    (JP) .................... 2006-121622

(51) Int. Cl.
*G11B 5/596* (2006.01)
(52) U.S. Cl. .................. 360/78.09; 360/78.06
(58) Field of Classification Search ........................ None
See application file for complete search history.

(56) References Cited

U.S. PATENT DOCUMENTS

| | | | | |
|---|---|---|---|---|
| 5,369,345 A | * | 11/1994 | Phan et al. | .................. 318/561 |
| 5,859,742 A | | 1/1999 | Takaishi | |
| 6,347,018 B1 | * | 2/2002 | Kadlec et al. | ............. 360/77.08 |
| 6,744,591 B2 | | 6/2004 | Nakagawa et al. | |
| 6,937,428 B2 | * | 8/2005 | Ho et al. | .................. 360/78.06 |
| 7,248,428 B2 | * | 7/2007 | Kim et al. | ................. 360/78.06 |

FOREIGN PATENT DOCUMENTS

| | | |
|---|---|---|
| JP | 03-233609 | 10/1991 |
| JP | 05-143165 | 6/1993 |
| JP | A 5-303849 | 11/1993 |
| JP | 06-187044 | 7/1994 |
| JP | 08-007506 | 1/1996 |
| JP | 2001-210033 | 8/2001 |
| JP | 2001-249702 | 9/2001 |
| JP | 2001-325005 | 11/2001 |
| JP | A 2002-287827 | 10/2002 |

* cited by examiner

*Primary Examiner*—Jason C Olson
(74) *Attorney, Agent, or Firm*—Greer, Burns & Crain, Ltd.

(57) ABSTRACT

A seek control device controls the seek of a plant to prevent the position shift due to an error between a model for generating seek current and a model of the plant. When the seek trajectory is provided by seek trajectory generation for controlling the seek of a plant, the frequency characteristic of a feed back loop is changed according to the seek time and the gain of the position shift component due to the shift of the actual plant and the model of the plant is increased, so as to suppress the position shift by the feed back loop. Dispersion of the seek time can be decreased, and an overrun or underrun can be prevented.

16 Claims, 16 Drawing Sheets

| Freq | a11 | a12 | a21 | a22 | L1 | L2 | L3 | L4 | L5 |
|------|------|--------|--------|--------|--------|--------|--------|--------|---------|
| 100  | 0.9986 | -0.0520 | 0.0520 | 0.9976 | 0.8433 | 1.1264 | 0.0769 | 0.0177 | -0.0431 |
| 200  | 0.9946 | -0.1039 | 0.1039 | 0.9925 | 0.8480 | 1.1344 | 0.0757 | 0.0347 | -0.0389 |
| 300  | 0.9878 | -0.1554 | 0.1554 | 0.9847 | 0.8525 | 1.1422 | 0.0746 | 0.0506 | -0.0327 |
| 400  | 0.9784 | -0.2065 | 0.2065 | 0.9743 | 0.8569 | 1.1497 | 0.0735 | 0.0654 | -0.0247 |
| 500  | 0.9663 | -0.2569 | 0.2569 | 0.9612 | 0.8612 | 1.1570 | 0.0724 | 0.0787 | -0.0150 |
| 600  | 0.9516 | -0.3066 | 0.3066 | 0.9455 | 0.8653 | 1.1640 | 0.0714 | 0.0905 | -0.0037 |
| 700  | 0.9344 | -0.3554 | 0.3554 | 0.9273 | 0.8693 | 1.1708 | 0.0704 | 0.1005 | 0.0089 |
| 800  | 0.9146 | -0.4031 | 0.4031 | 0.9066 | 0.8732 | 1.1773 | 0.0693 | 0.1087 | 0.0227 |
| 900  | 0.8924 | -0.4498 | 0.4498 | 0.8834 | 0.8770 | 1.1836 | 0.0683 | 0.1150 | 0.0375 |
| 1000 | 0.8678 | -0.4952 | 0.4952 | 0.8579 | 0.8806 | 1.1895 | 0.0674 | 0.1191 | 0.0531 |
| 1100 | 0.8408 | -0.5391 | 0.5391 | 0.8301 | 0.8842 | 1.1953 | 0.0664 | 0.1210 | 0.0692 |
| 1200 | 0.8116 | -0.5816 | 0.5816 | 0.8000 | 0.8876 | 1.2007 | 0.0655 | 0.1207 | 0.0858 |
| 1300 | 0.7803 | -0.6225 | 0.6225 | 0.7678 | 0.8910 | 1.2059 | 0.0646 | 0.1180 | 0.1024 |
| 1400 | 0.7468 | -0.6616 | 0.6616 | 0.7336 | 0.8942 | 1.2107 | 0.0637 | 0.1130 | 0.1190 |
| 1500 | 0.7114 | -0.6989 | 0.6989 | 0.6974 | 0.8974 | 1.2153 | 0.0628 | 0.1056 | 0.1353 |

SEEK CONTROL METHOD, SEEK CONTROL DEVICE AND DISK DEVICE

CROSS-REFERENCE TO RELATED APPLICATIONS

This application is based upon and claims the benefit of priority from the prior Japanese Patent Application No. 2006-121622, filed on Apr. 26, 2006, the entire contents of which are incorporated herein by reference.

BACKGROUND OF THE INVENTION

1. Field of the Invention

The present invention relates to a seek control method, seek control device and disk device for controlling seeking of an object to a target position, and more particularly to a seek control method, seek control device and disk device for controlling seeking by a two-degree of freedom control system.

2. Description of the Related Art

A control for moving an object to a target position, that is so called "seek control", is widely known. Particularly in disk devices, such as magnetic disk devices and optical disk devices, accurately positioning the head to a target track by seek control is extremely important to improve recording density.

In seek control for a disk device, a control method called two-degree of freedom control, or feed forward control, is used. In this control method, a target position trajectory is supplied to the control system according to the time elapsed from the seek start time, or both target position trajectory and current trajectory are supplied.

FIG. 25 is a block diagram depicting the control system of a conventional two-degree of freedom control. As FIG. 25 shows, when a plant 108, which is a control object, is moved to the target position "r" by seeking, the position trajectory, or velocity trajectory or acceleration trajectory uf is created in the trajectory creation block 100 from the target position "r", and is supplied to the plant 108.

In the feed back loop system, the computing block 102 computes position error between the current position "y" of the plant 108 and the target position "r", and the controller 104 computes a control amount so as to decrease the position error from the position error, and the computing block 106 adds the control amount to the above mentioned seek trajectory uf, and drives the plant 108 using this added value "u".

In this way, the seek trajectory uf is created from the target position "r" to perform seek control. The characteristic Pm of the trajectory creation block 100 is ideally the same characteristic P of the plant 108. In other words, if the characteristic of the plant 108 is P, the characteristic of the trajectory creation block 100 is ideally 1/Pm=1/P.

To create a seek trajectory, a method of computing the current trajectory (acceleration trajectory) and position trajectory using a polynomial of the elapsed time from the seek start time has been proposed (e.g. Japanese Patent Applications Laid-Open No. H03-233609 and No. H05-143165). Also a method of generating a trajectory to remove the influence of resonance frequency is proposed (e.g. Japanese Patent Applications Laid-Open No. 2001-210033, No. H8-007506 and No. H6-187044).

In these prior arts, the object is suppressing the resonance of the plant by improving the seek trajectory so as to increase the speed of seeking. A problem of seek control is a shift between the target trajectory and the actual response of the plant. This shift is mainly generated by the gain difference between the model (block 100) when the target trajectory is generated and the actual control target 108. Currently as the track density increases, even a 1% shift causes several hundred tracks of shift if the seek distance reaches several tens of thousand tracks.

The feed back control loop of the prior art operates such that this position shift is corrected, but during seek control, the servo frequency band is dropped compared with the time of following so that the trajectory control is not interfered with. Therefore if the shift is major, an overrun or underrun is generated, and re-seeking becomes necessary, and seek time when seek ends disperses.

SUMMARY OF THE INVENTION

With the foregoing in view, it is an object of the present invention to provide a seek control method, seek control device and disk device for decreasing dispersion of seek time even if the target trajectory and actual response of the plant do not match.

It is another object of the present invention to provide a seek control method, seek control device and disk device for preventing an overrun or underrun even if the target trajectory and actual response of the plant do not match.

It is still another object of the present invention to provide a seek control method, seek control device and disk device for decreasing the dispersion of seek time, and implementing high-speed seeking.

A seek control method of the present invention is a seek control method for seeking an object from a current position to a target position by an actuator, having a step of generating a seek trajectory signal according to the target position, a step of generating a feed back control signal of the actuator from the position error between the current position of the object and the target position by a feed back loop, a step of driving the actuator by the seek trajectory signal and the feed back control signal, a step of determining a representative frequency to be suppressed according to the seek time from the current position to the target position, and a step of changing the frequency characteristic of the feed back loop so as to suppress the determined representative frequency.

The seek control device of the present invention is a seek control device for seeking an object from a current position to a target position by an actuator, having: a block for supplying a seek trajectory signal according to the target position; a feed back loop for generating a feed back control signal of the actuator from the position error between the current position of the object and the target position; a block for computing a drive value of the actuator by the seek trajectory signal and the feed back control signal; and a block for determining a representative frequency to be suppressed at least according to the seek time from the current position to the target position, and changing the frequency characteristic of the feed back loop so as to suppress the determined representative frequency.

The disk device of the present invention has: a head for at least reading data on a disk storage medium; an actuator for positioning the head to a predetermined position on the disk storage medium; and a control unit which has: a block for supplying a seek trajectory signal according to the target position; a feed back loop for generating a feed back control signal of the actuator from the position error between the current position of the object and the target position; and a block for computing a drive value of the actuator from the seek trajectory signal and the feed back control signal. And the control unit determines the representative frequency to be suppressed at least according to the seek time from the current position to the target position, and changes the frequency characteristic of the feed back loop so as to suppress the determined representative frequency.

In the present invention, it is preferable that the determining step has a step of determining the representative frequency to be suppressed from the seek time and a seek waveform of the seek trajectory signal.

Also in the present invention, it is preferable that the changing step has a step of changing the frequency characteristic of the feed back loop so that the representative frequency is suppressed on a sensitivity function of the feed back loop.

Also in the present invention, it is preferable that the determining step further has a step of determining a frequency with which the power spectrum of the seek waveform becomes the maximum as the representative frequency.

Also in the present invention, it is preferable that the generating step has a step of supplying the seek trajectory signal by feed forward control.

Also in the present invention, it is preferable that the feed back step has a step of generating a feed back control signal of the actuator by observer control.

Also in the present invention, it is preferable that the change step further has a step of changing a disturbance estimation gain for the observer control according to the representative frequency.

When seek control is performed, by providing a seek trajectory, the frequency characteristic of the feed back loop is changed, so the gain of the position shift component, due to the shift of the actual plant and the model of the plant, increases, and the feed back loop can control so as to suppress the position shift. In other words, dispersion of seek time can be decreased, and an overrun or underrun can be prevented.

DESCRIPTION OF THE PREFERRED EMBODIMENTS

Embodiments of the present invention will now be described in the sequence of disk device, first embodiment, second embodiment, third embodiment, fourth embodiment, fifth embodiment and sixth embodiment of the seek control system, and other embodiments, but the present invention is not limited to these embodiments.

Disk Device

Figure 1:
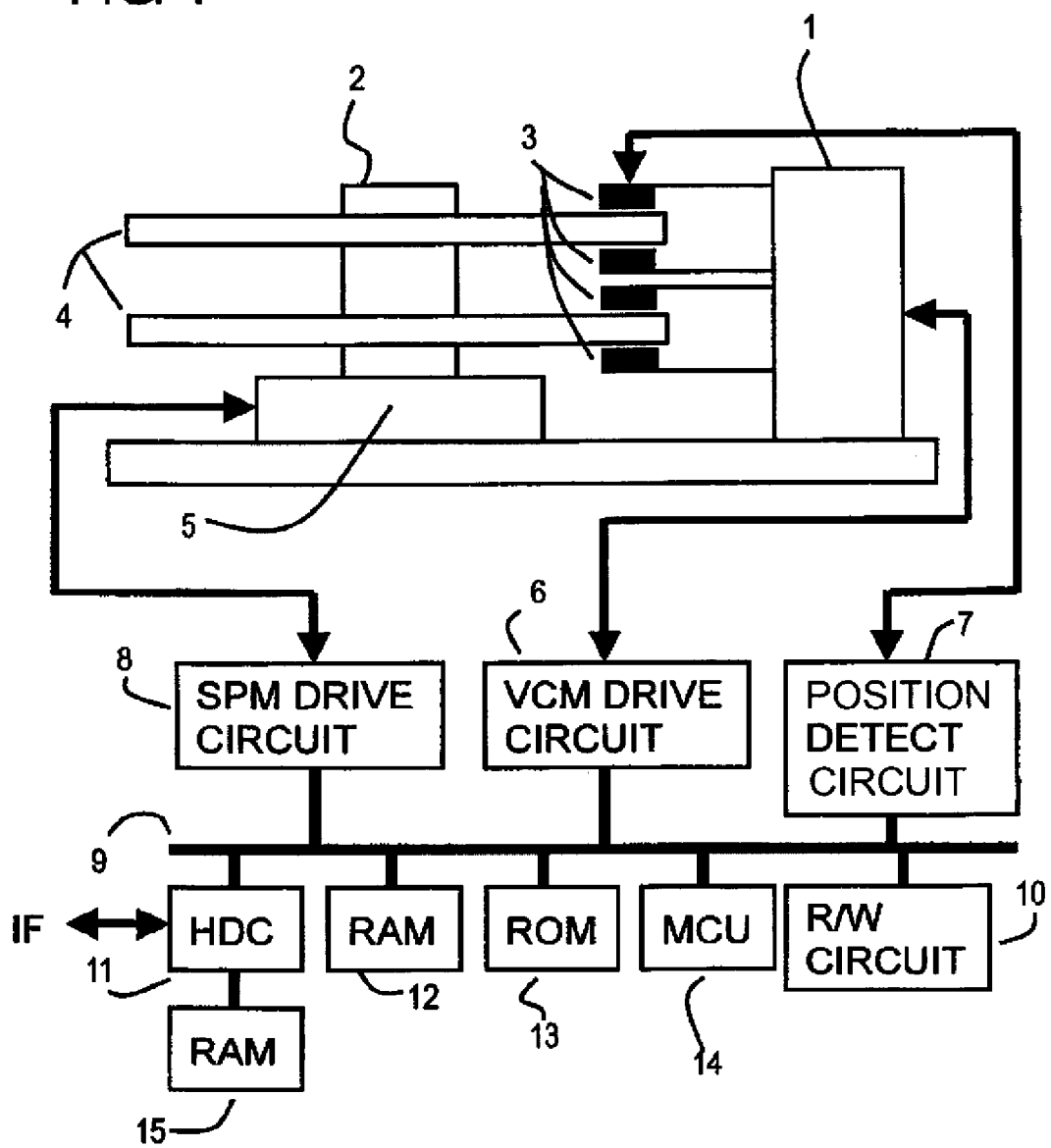
FIG. 1 is a block diagram depicting the disk device according to an embodiment of the present invention.
Figure 2:
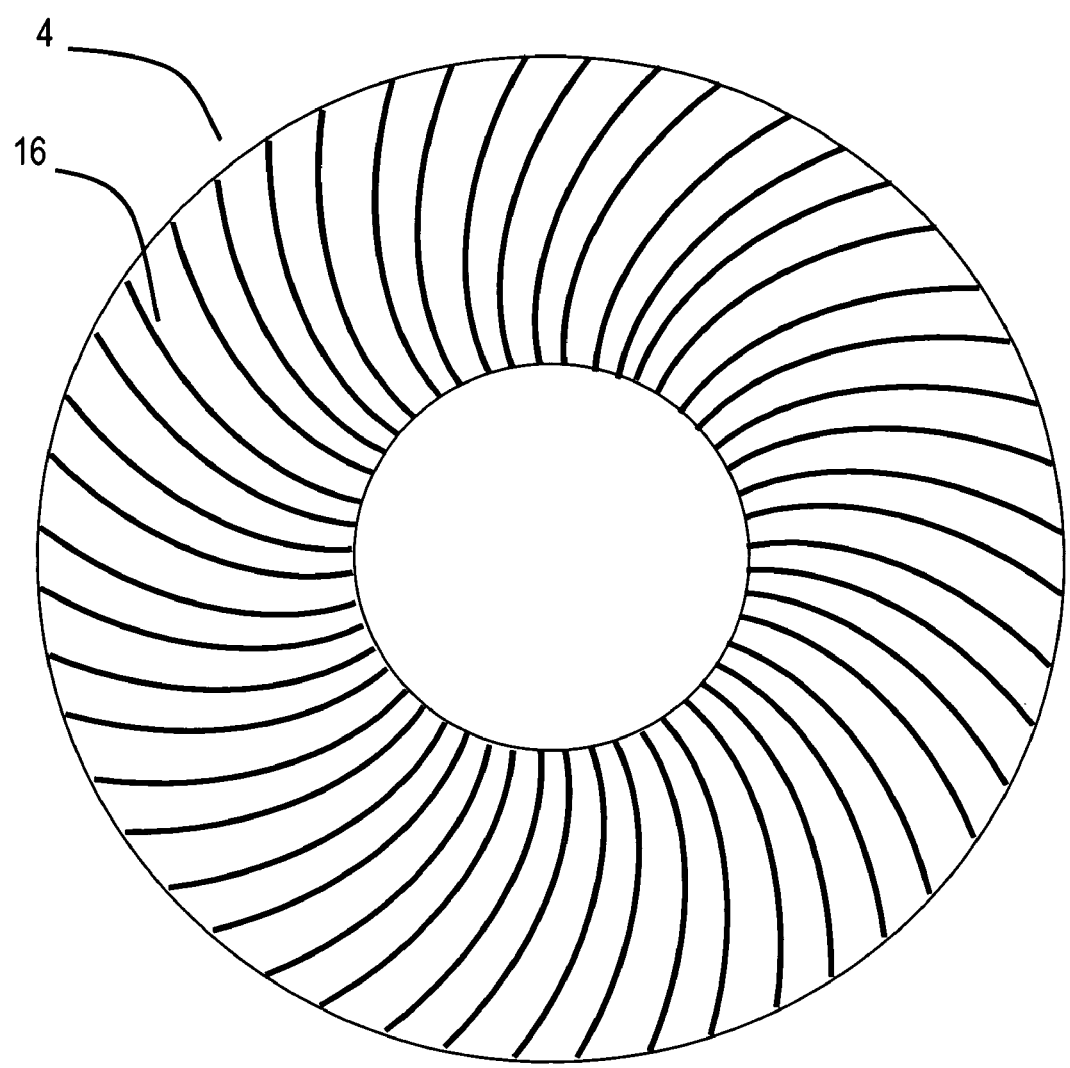
FIG. 2 is a diagram depicting the position signals of the disk in FIG. 1.
Figure 3:
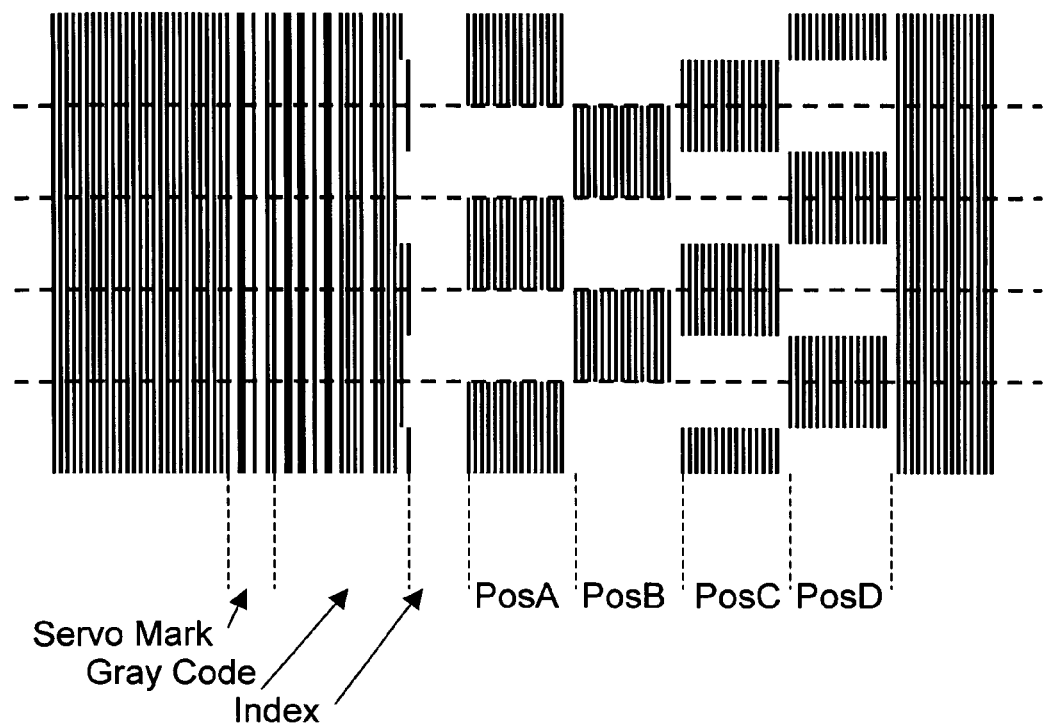
FIG. 3 is a diagram depicting the details of the position signals in FIG. 2.

FIG. 1 is a block diagram depicting the disk device according to an embodiment of the present invention, FIG. 2 is a diagram depicting the arrangement of the position signals of the magnetic disk in FIG. 1, and FIG. 3 is a diagram depicting the position signals of the magnetic disk in FIG. 1 and FIG. 2.

FIG. 1 shows a magnetic disk device, which is a type of disk device. As FIG. 1 shows, a magnetic disk 4, which is a magnetic storage medium, is installed at a rotation axis 2 of a spindle motor 5. The spindle motor 5 rotates a magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on the slider, and write element, including the write coil, stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1, and drives the VCM 1.

A microcontroller (MCU) 14 detects (demodulates) the current position from the digital position signals from the position detection circuit 7, and calculates the VCM drive instruction value according to the error between the detected current position and the target position. In other words, the microcontroller 14 performs position demodulation and servo control including disturbance suppression described in FIG. 5 and later. A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/reproduces the data. A random access memory (RAM) for the buffer 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, on the magnetic disk 4, servo signals (position signals) 16 are arrayed in each track in the circumference direction from the outer circumference to the inner circumference with an equal interval. Each track has a plurality of sectors, and the solid lines in FIG. 2 indicate a position where the servo signals 16 are recorded. As FIG. 3 shows, the position signal is comprised of a servo mark ServoMark, track number GrayCode, index Index and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

The MCU 14 confirms the position of the actuator 1 through the position detection circuit 7 in FIG. 1, performs servo computation, and supplies approximate current to the VCM 1. In other words, in the seek control for moving the head 3 from a certain track position to the target track position, the head can be moved to the target position through the transition from the coarse control, settling control to the following control. The coarse control is basically a trajectory control, and settling control and following control are basically positional controls, for both of which the current position of the head must be detected.

To confirm the position like this, the servo signals are recorded on the magnetic disk in advance, as mentioned in FIG. 2. In other words, as FIG. 3 shows, servo marks which indicate the start position of the servo signal, graycode which indicates the track number, index signal, and signals PosA to PosD which indicate the offset, are recorded on the magnetic disk in advance. These signals are read by the magnetic head, and these servo signals are converted into digital values by the position detection circuit 7.

First Embodiment of Seek Control System

Figure 4:
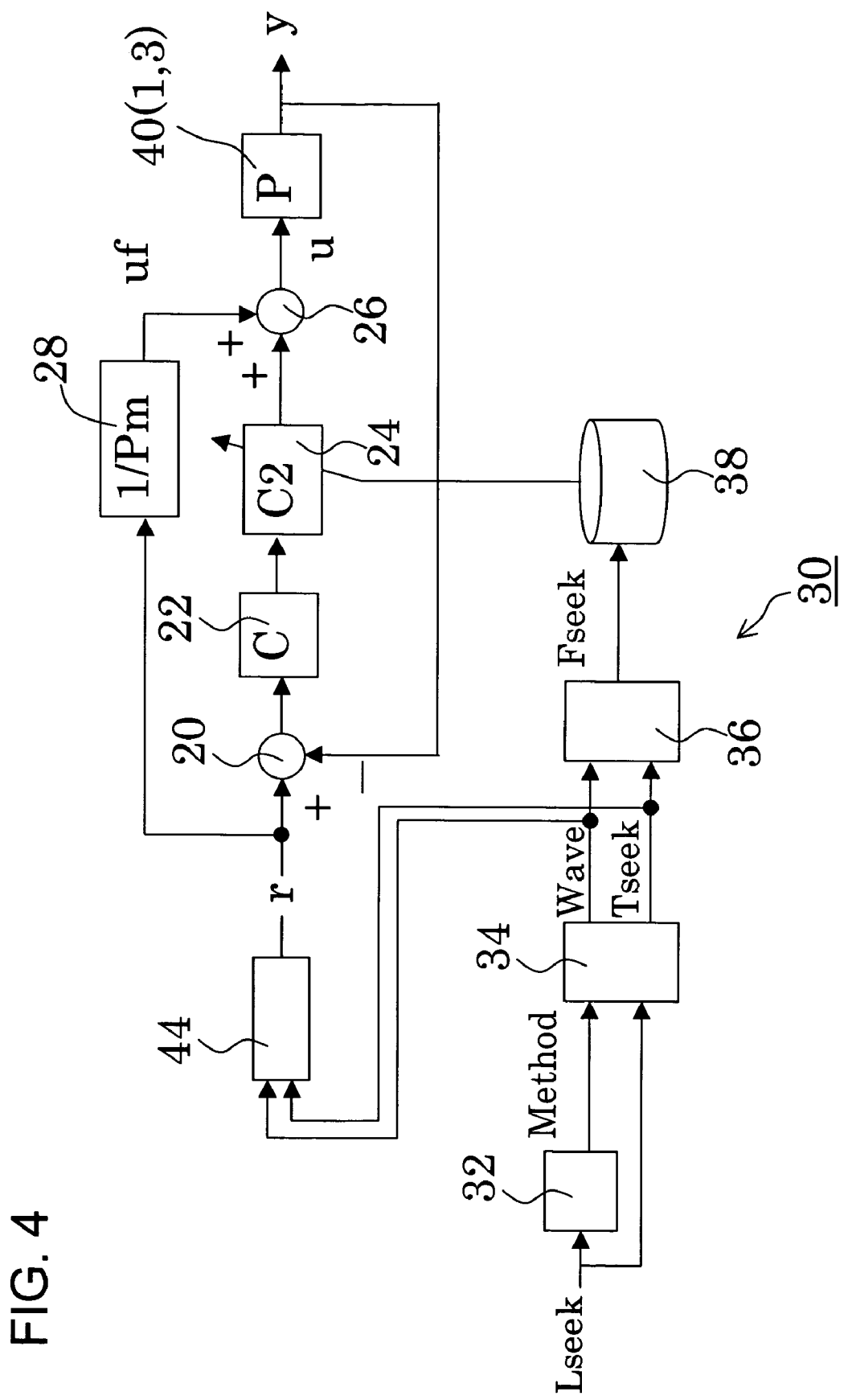
FIG. 4 is a block diagram depicting the first embodiment of the seek control system of the head in FIG. 1.

FIG. 4 is a block diagram depicting a first embodiment of the positioning control system for the MCU 14 in FIG. 1 to execute. This positioning control system is a feed back control loop of the two-degree of freedom control system in which a compensator 24 for changing the frequency characteristic of a specific frequency according to the seek distance.

As FIG. 4 shows, the plant 40 (head 3 and actuator 1 in the case of FIG. 1), which is a control target, is moved to the target position "r" in seek control. The trajectory creation block 28 creates a position trajectory, or a velocity trajectory or an acceleration trajectory "uf" from the target position "r", and outputs it to the computing block 26.

In the feed back loop system, on the other hand, the computing block 20 computes the position error between the position "y" of the plant 40 and the target position "r", and the controller 22 computes the control amount so as to decrease position error from the position error. The frequency compensation block 24 can change the frequency characteristic from the outside, and suppresses the specific frequency on a sensitivity function. The computing block 26 adds the output of the frequency compensation block 24 to the seek trajectory uf, and drives the plant 40 by the added value "u".

In seek control, the seek trajectory "uf" is created from the target position "r" (position component which sequentially changes up to the target position), and seek control is performed. It is ideal that the characteristic Pm of the trajectory creation block 28 is the same as the characteristic P of the plant 40. In other words, if the characteristic of the plant 40 is P, then it is ideal that the characteristic of the trajectory creation block 28 is 1/Pm=1/P.

However, actually a shift is generated to the characteristics. In other words, the characteristic of the plant 40 acquired in design is often different from the characteristic of the actually used plant 40, and the characteristic also differs depending on the device. For example, the plant 40 includes the drive amplifier and actuator, but strictly speaking the characteristics of these physical units are not constant. Therefore the above mentioned shift is generated in the characteristics.

The shift of the characteristics is compensated for by the feed back control system. First in FIG. 4, the transfer function from the target position "r" to the observation position "y" is determined, then the following Expression (1) is acquired. Here C is a characteristic (transfer function) of the controller 22, P is a characteristic (transfer function) of the plant 40, and Pm is a characteristic (transfer function) of the above mentioned trajectory creation block 28.

$$y = \left\{1 + \frac{1}{1+C\cdot P}\left(\frac{P}{Pm} - 1\right)\right\} r \quad (1)$$

As Expression (1) shows, if P=Pm, (P/Pm−1)=0 in Expression (1), so Expression (1) is "y"="r", which means that no position shift is generated. Actually, however, a gain shift is generated between the model of the trajectory creation and the model of the plant. So the shift G of the gain is defined in Expression (2), then Expression (1) is transformed into Expression (3).

$$G = P/Pm - 1 \quad (2)$$

$$y - r = G\frac{Pm}{1+C\cdot P} r \quad (3)$$

In other words, the position shift is generated by the amount of (y−r) in Expression (3). This shift is compensated for by the feed back control system. The above position shift is expressed by "uf" instead of "r", then r·(1/Pm)=uf, as shown in FIG. 4, so Expression (3) is transformed into Expression (4).

$$y - r = G \frac{Pm}{1 + C \cdot P} uf \quad (4)$$

Expression (4) shows that the position shift is the acceleration disturbance (current disturbance) characteristic (Pm/(1+CP)) multiplied by the gain error G of the model.

In seek control, the form of the current waveform uf differs depending on the seek conditions. Specifically, the current waveform differs depending on the seek time which is set according to the seek distance. For example, the current waveform differs depending on whether the seek distance is long or short. The current waveform which differs depending on the seek time means that the frequency of the power of the current waveform differs depending on the seek time.

This means that the frequency which causes a large influence on the gain shift G in position shift differs depending on the seek time. In other words, by a feed back control system compensating a specific frequency according to the seek time, a position shift can be decreased.

Figure 5:
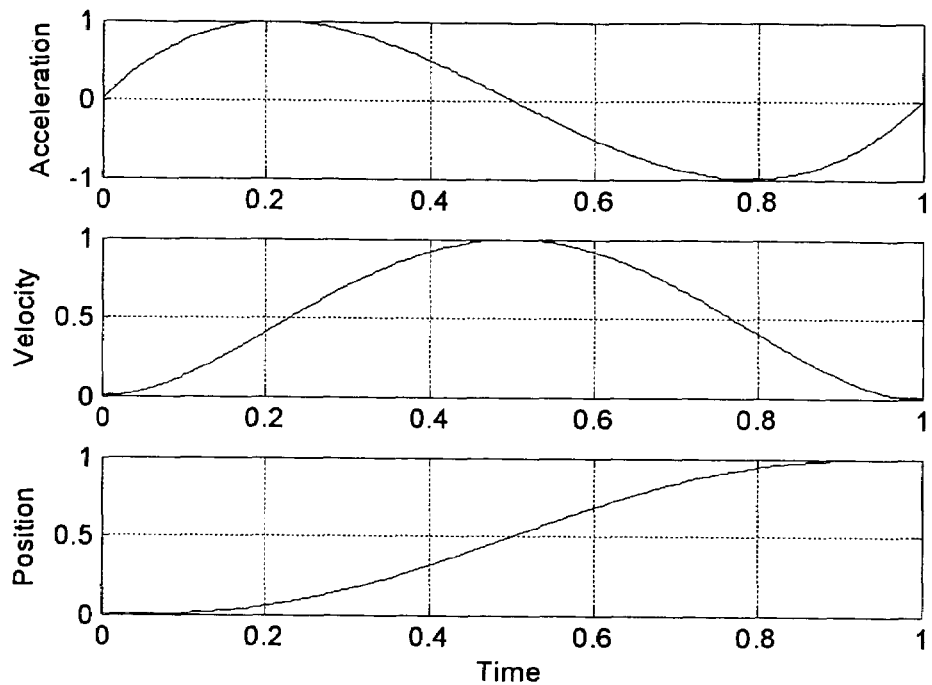
FIG. 5 are diagrams depicting the seek trajectory in FIG. 4.
Figure 6:
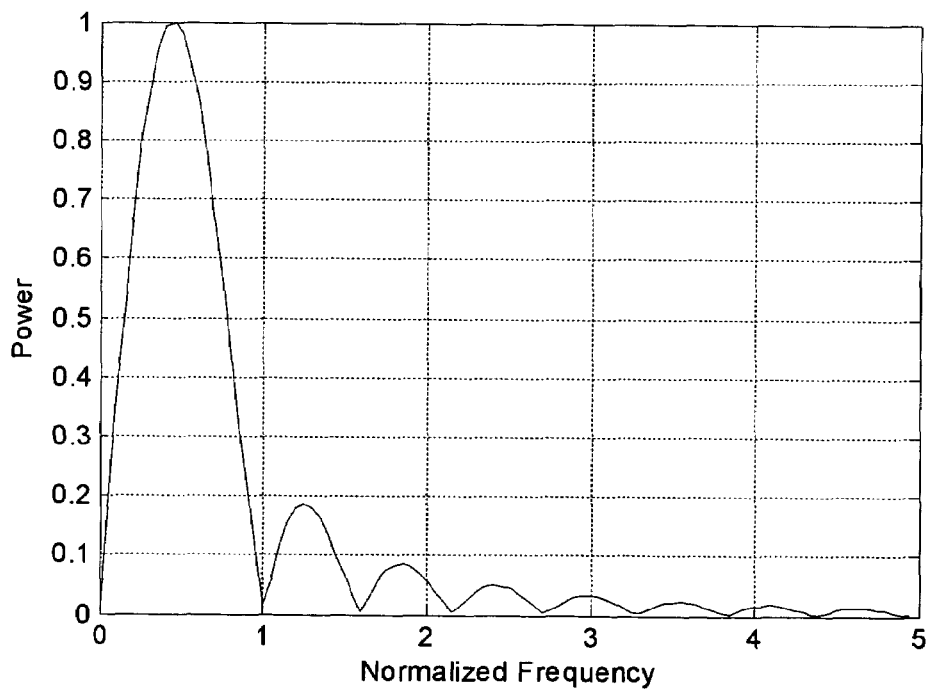
FIG. 6 is a diagram depicting the power spectrum of the seek waveform in FIG. 5.

FIG. 5 are diagrams depicting the seek trajectory, and FIG. 6 is a diagram depicting the power spectrum of the current waveform thereof. Examples of the seek trajectory shown in FIG. 5 (see Japanese Patent Application Laid-Open No. H03-233609) are example of the trajectory when the abscissa is time and the ordinate is acceleration, velocity or position respectively. Here the time-based transitions of acceleration and velocity of the seek movement, when the unit time is "1", unit distance is "1" are shown.

In seek control, the acceleration current uf is supplied according to the distance and velocity, and the frequency of the acceleration current differs depending on the seek time according to the seek distance. Here the frequency of the acceleration current is normalized by the unit time, and the frequency of the acceleration current differs if the time differs.

FIG. 6 shows the acceleration, that is the power spectrum of the current waveform. The abscissa of FIG. 6 indicates the normalized frequency, and the ordinate is the normalized power of the current waveform. FIG. 6 depicts the power spectrum of a certain seek trajectory (acceleration current). As FIG. 6 shows, the peak frequency with which power becomes the maximum according to the seek trajectory (acceleration current) is uniquely determined, and the peak frequency with which power is the maximum differs depending on the seek trajectory, that is the seek time.

Figure 7:
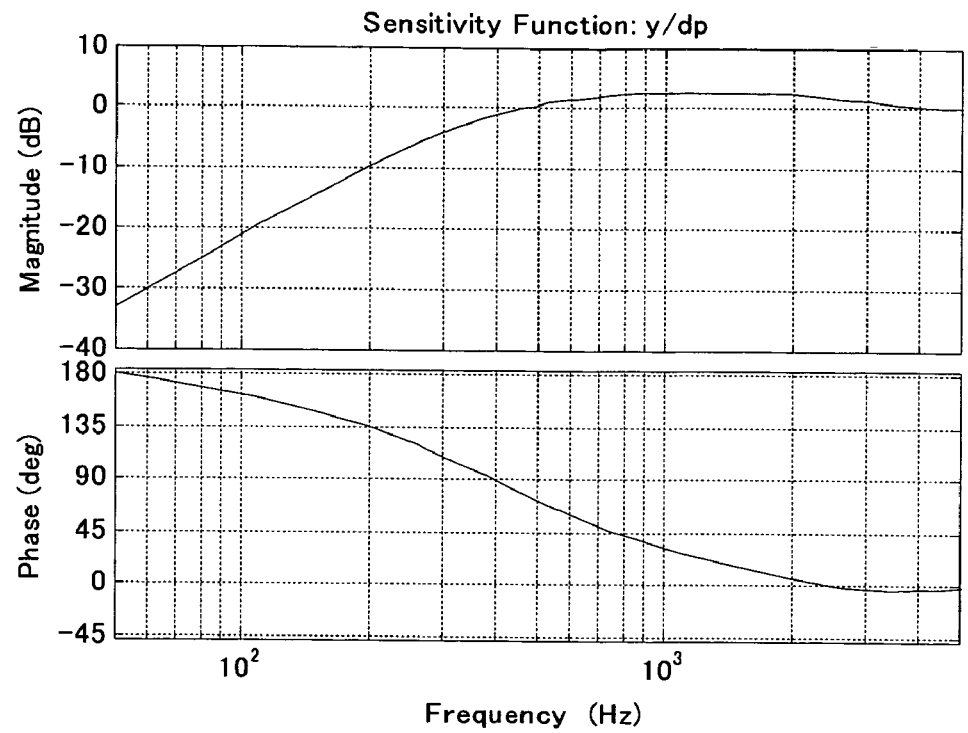
FIG. 7 is characteristic diagram depicting the sensitivity function of the control system in FIG. 4.
Figure 8:
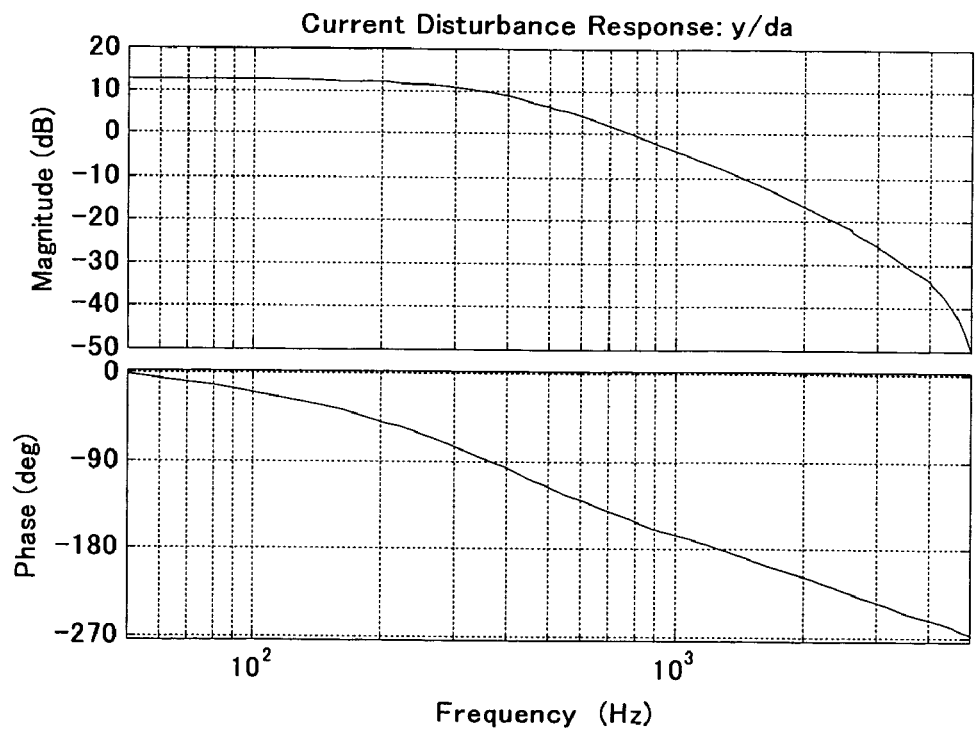
FIG. 8 is characteristic diagram depicting the acceleration disturbance of the control system in FIG. 4.

FIG. 7 are characteristic diagrams of the sensitivity function in the seek control in which frequency compensation is not performed, and FIG. 8 are characteristic diagrams of the acceleration disturbance in the seek control in which frequency compensation is not performed. In FIG. 7 and FIG. 8, the abscissa is the frequency and the ordinate is the gain (dB) in the top graph, and the abscissa is the frequency and the ordinate is the phase (deg) in the bottom graph.

The sensitivity function is indicated by the characteristic of the feed back loop, that is (1/(1+CP)). The acceleration disturbance characteristic is indicated by the characteristic of the disturbance to the feed back loop by a seek trajectory current, that is (P/(1+CP)).

The transfer function (Expression (3) or (4)) by "r" or "uf" according to the gain shift G indicated in Expression (3) or (4) is the characteristic in FIG. 7 or FIG. 8 multiplied by the gain G. In other words, by appropriately shaping the sensitivity function and the acceleration disturbance characteristic according to the seek time, a specific frequency compensation according to the seek time can be implemented. In other words, the control system is adjusted so as to suppress around the frequency with which power of the frequency characteristic is the maximum for each seek waveform.

FIG. 9 to FIG. 12 show the seek waveform (FIG. 9), power spectrum of the current waveform (FIG. 10), sensitivity function (FIG. 11) and acceleration disturbance characteristic (FIG. 12) in the case when the seek time is 4 ms, as an example.

Figure 9:
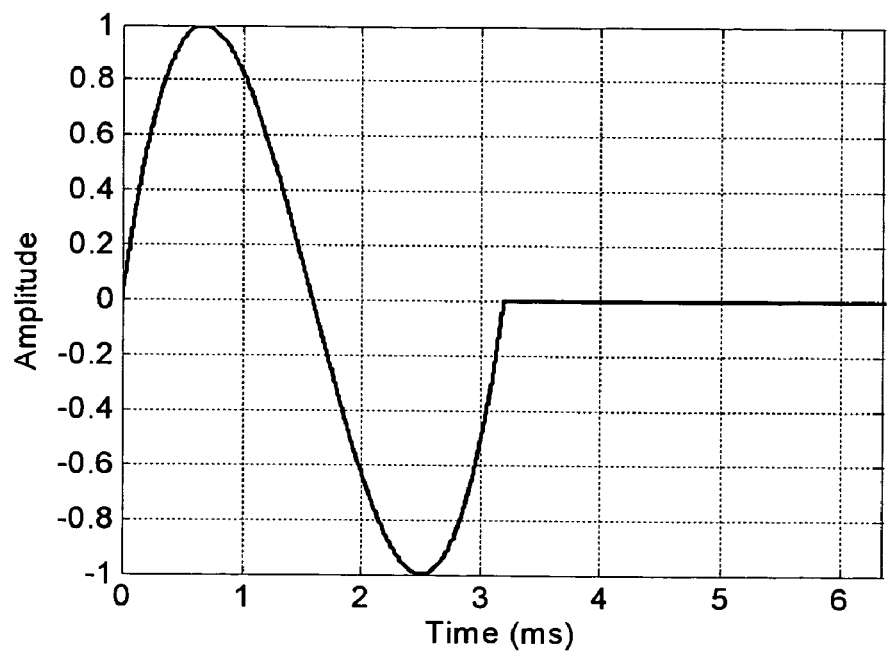
FIG. 9 is a diagram depicting the seek waveform of the seek time in FIG. 4 and FIG. 5.
Figure 10:
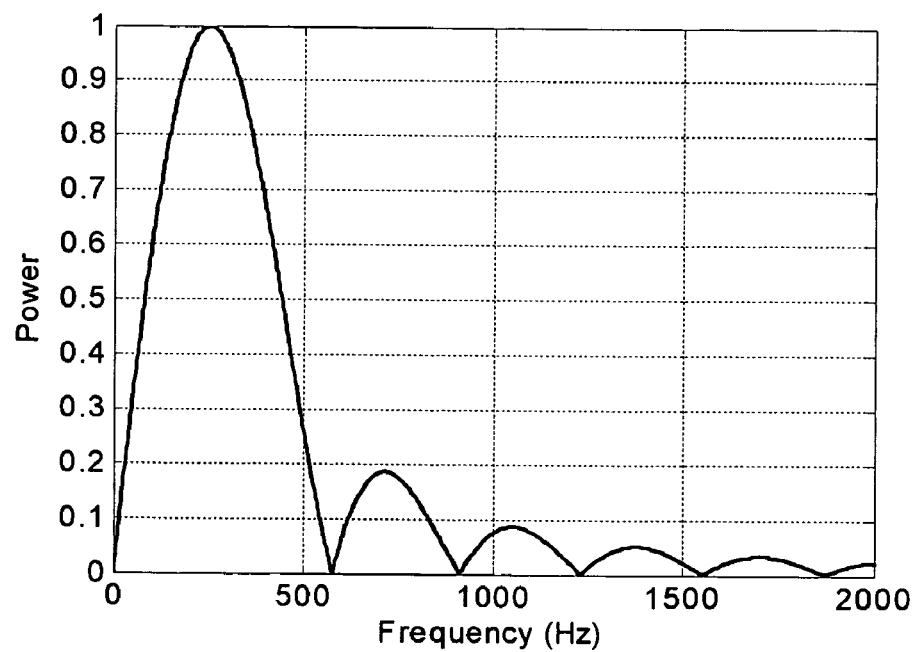
FIG. 10 is a diagram depicting the power spectrum of the seek waveform in FIG. 9.

It is assumed that the acceleration waveform is a form shown in FIG. 9 when the seek time is 4 ms. In FIG. 9, the abscissa is the time and the ordinate is the normalized amplitude. In the power spectrum of this current waveform, the maximum power is when the frequency is ¼ ms=250 Hz, as shown in FIG. 10. In FIG. 10, the abscissa is the frequency and the ordinate is the power, indicated by a linear axis.

Figure 11:
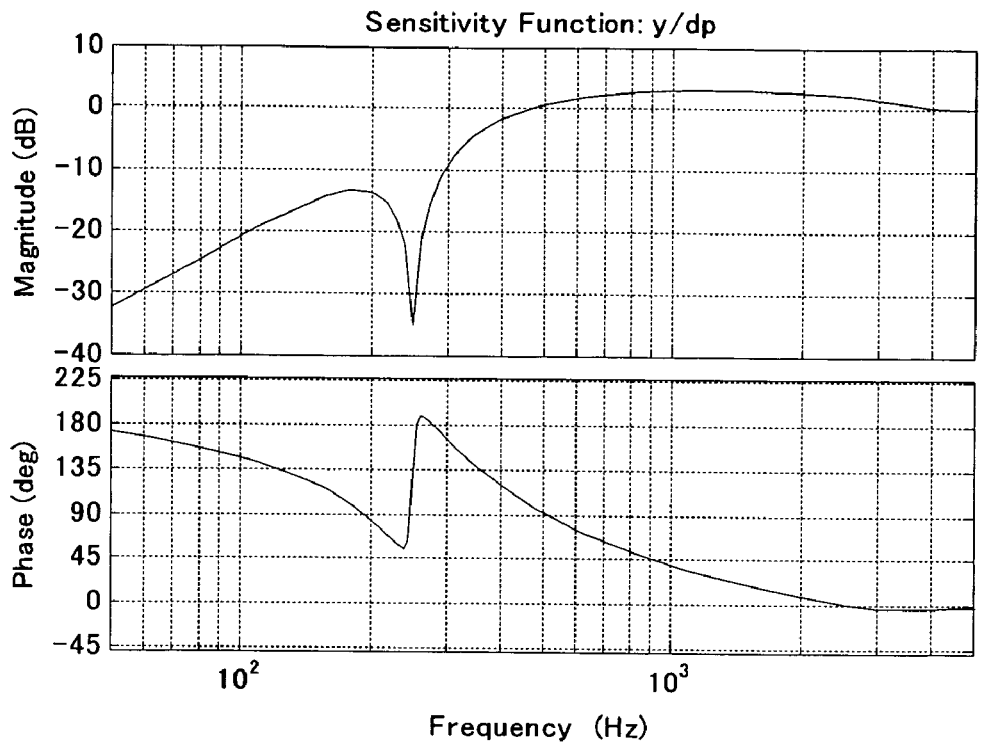
FIG. 11 is a characteristic diagram depicting the sensitivity function of the control system in FIG. 4 corresponding to the power spectrum in FIG. 10.
Figure 12:
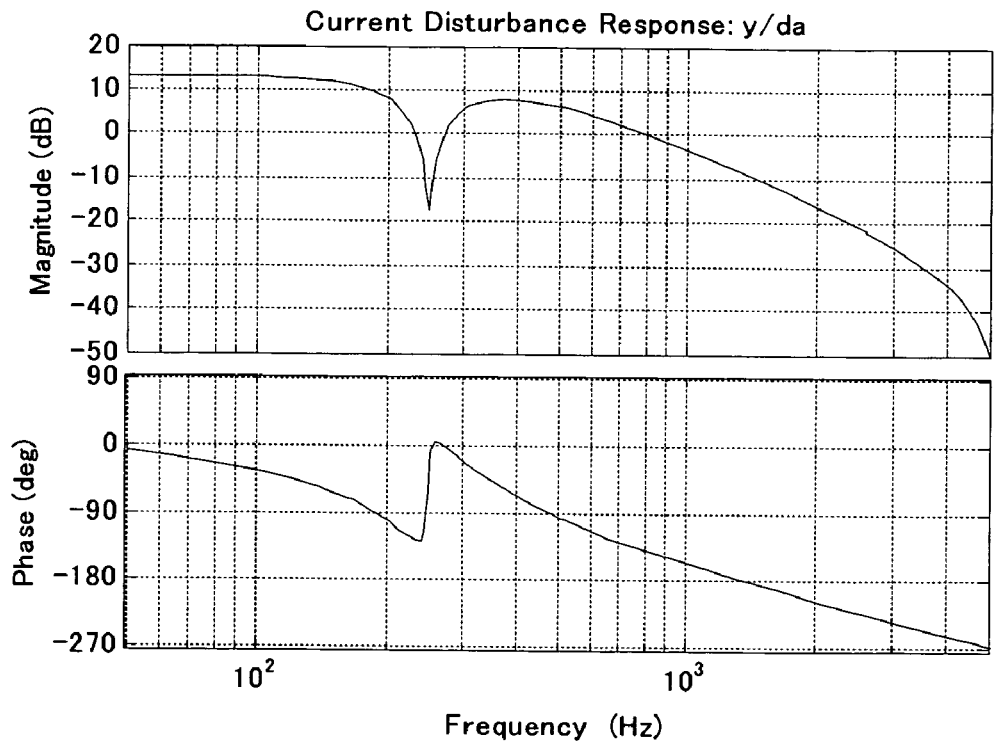
FIG. 12 is a characteristic diagram depicting the acceleration disturbance of the control system in FIG. 4 corresponding to the power spectrum in FIG. 10.

Therefore the control system is constructed such that the effect of suppressing around 250 Hz becomes high. FIG. 11 is characteristic diagrams of the sensitivity function suppressing around 250 Hz, and FIG. 12 is characteristic diagrams of acceleration disturbance suppressing around 250 Hz. In both figures, just like the case of FIG. 7 and FIG. 8, the abscissa is the frequency and the ordinate is the gain (dB) in the top graph, and the abscissa is the frequency and the ordinate is the phase (deg) in the bottom graph.

The sensitivity function is indicated by the characteristic of the feed back loop, that is (1/(1+CP)), so this characteristic, that is the frequency characteristic, is changed according to the seek time. Or the acceleration disturbance characteristic is indicated by the characteristic of the disturbance to the feed back loop by the seek trajectory current, that is (P/(1+CP)), so in the same manner, the frequency characteristic is changed according to the seek time.

In the same way, FIG. 13 to FIG. 16 show the seek waveform (FIG. 13), power spectrum of the current waveform (FIG. 14), sensitivity function (FIG. 15), and acceleration disturbance characteristic (FIG. 16) in the case when the seek time is 2 ms, as an example.

Figure 13:
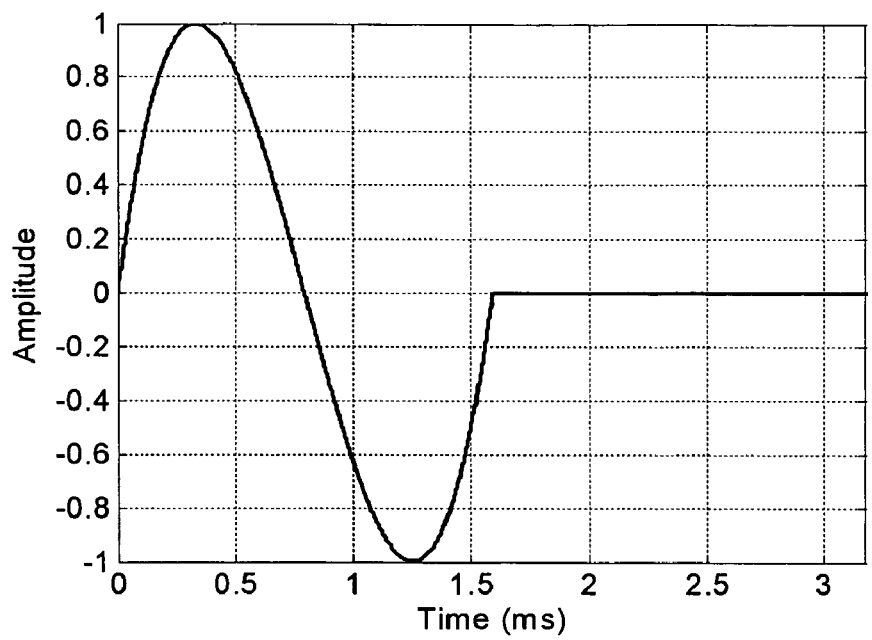
FIG. 13 is a diagram depicting another seek waveform of the seek time in FIG. 4 and FIG. 5.
Figure 14:
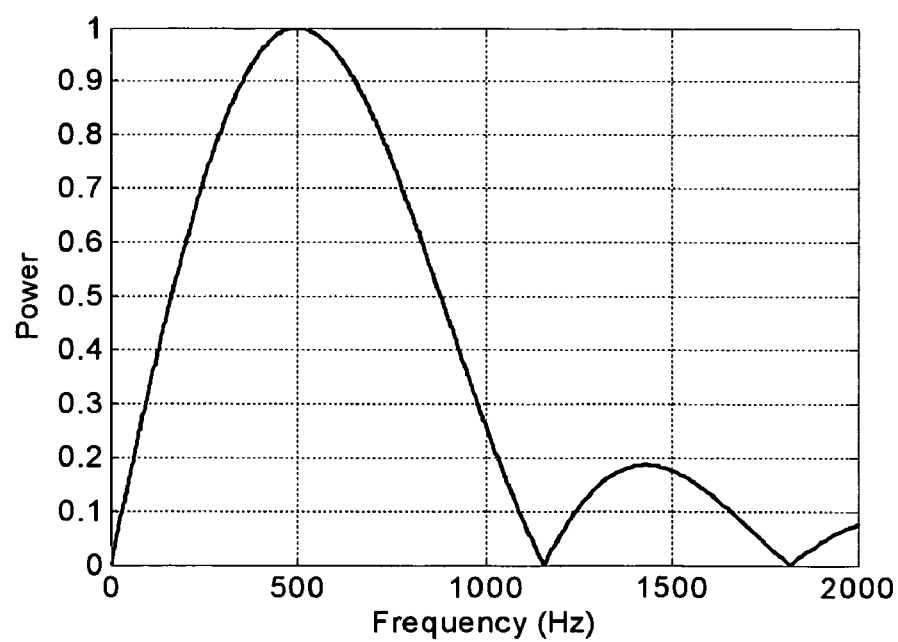
FIG. 14 is a diagram depicting the power spectrum of the seek waveform in FIG. 13.

It is assumed that the acceleration waveform is a form shown in FIG. 13 when the seek time is 2 ms. In FIG. 13, the abscissa is the time and the ordinate is the normalized amplitude. In the power spectrum of this current waveform, maximum power is when the frequency is ½ ms=500 Hz, as shown in FIG. 14. In FIG. 14, the abscissa is the frequency and the ordinate is the power, indicated by a linear axis.

Figure 15:
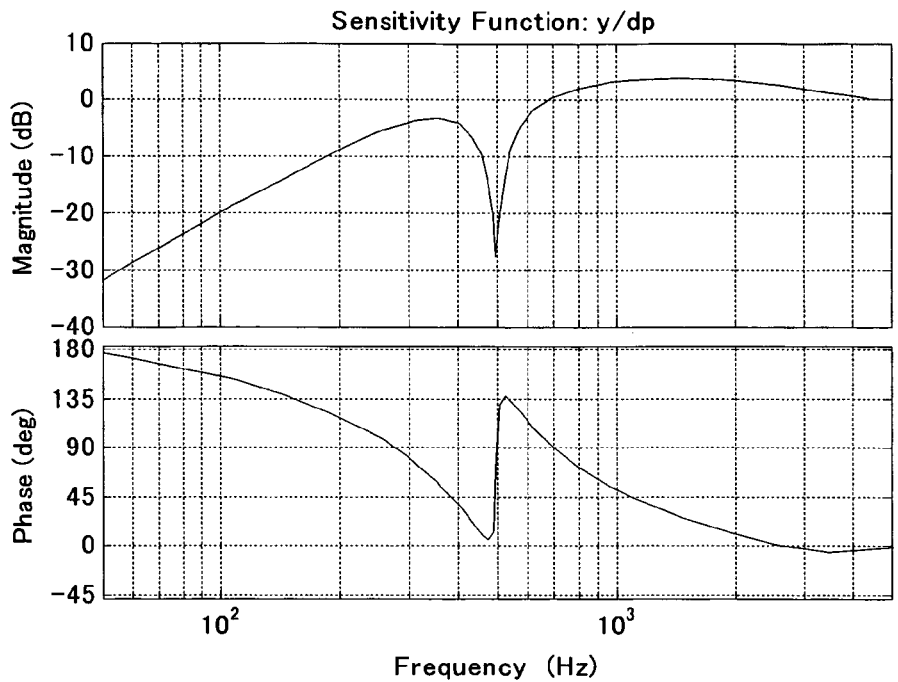
FIG. 15 is a characteristic diagram depicting the sensitivity function of the control system in FIG. 4 corresponding to the power spectrum in FIG. 14.
Figure 16:
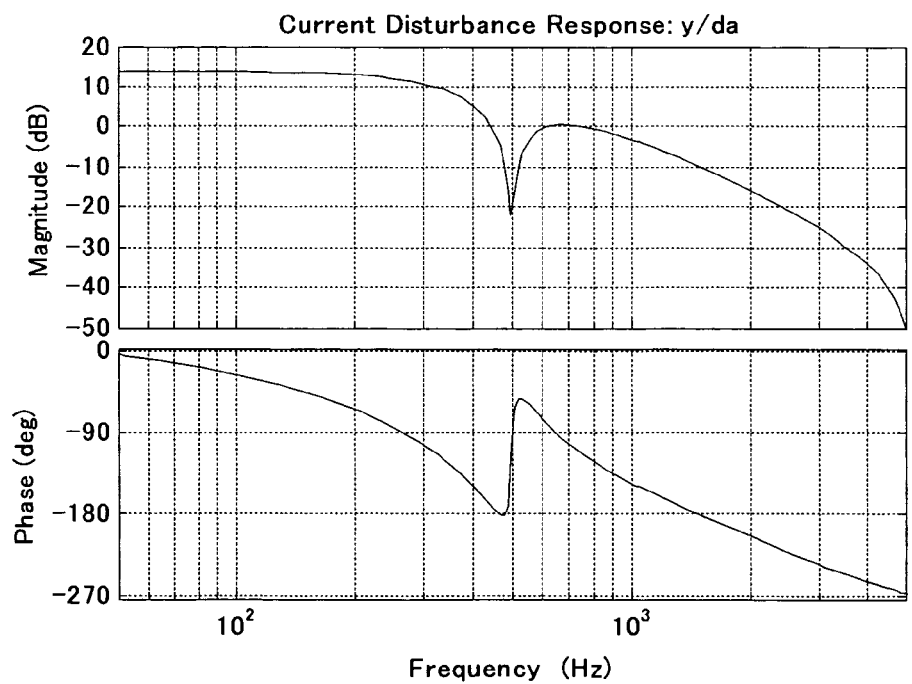
FIG. 16 is a characteristic diagram depicting the acceleration disturbance of the control system in FIG. 4 corresponding to the power spectrum in FIG. 14.

Therefore the control system is constructed such that the effect of suppressing around 500 Hz becomes high. FIG. 15 is characteristic diagrams of the sensitivity function suppressing around 500 Hz, and FIG. 16 is characteristic diagrams of the acceleration disturbance suppressing around 500 Hz. In both figures, just like the case of FIG. 7 and FIG. 8, the abscissa is the frequency and the ordinate is the gain (dB) in the top graph, and the abscissa is the frequency and the ordinate is the phase (deg) in the bottom graph.

The sensitivity function is indicated by the characteristic of the feed back loop, that is (1/(1+CP)), so this characteristic, that is the frequency characteristic, is changed according to the seek time. Or the acceleration disturbance characteristic is indicated by the characteristic of the disturbance to the feed back loop by the seek trajectory current, that is (P/(1+CP)), so in the same manner, the frequency characteristic is changed according to the seek time.

A simple description was provided here, but various seek waveforms can be formed by adjusting values according to not only the inverse number of the seek time, but also t the form of the current waveform (see FIG. 9 and FIG. 13, for example).

Figure 17:
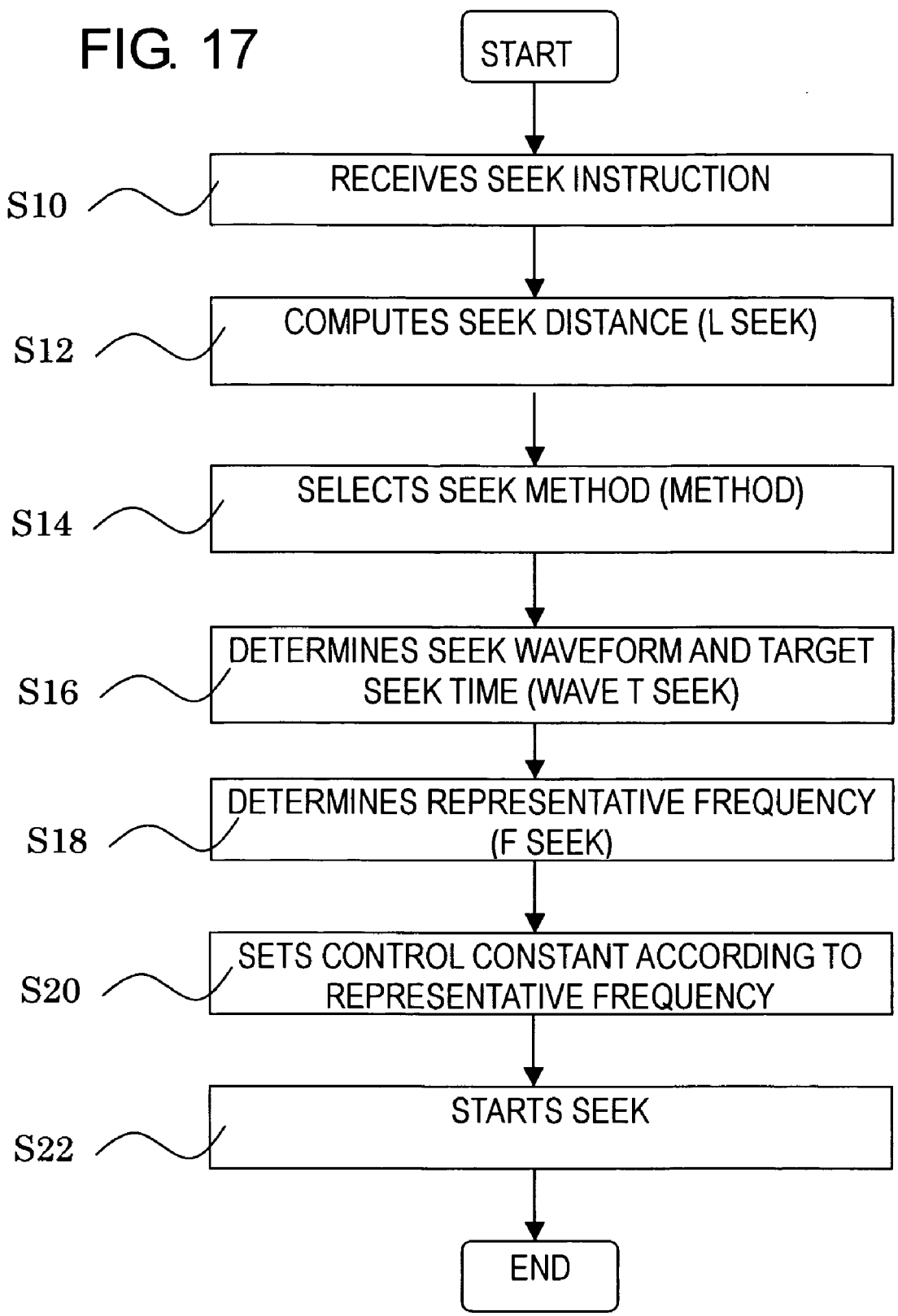
FIG. 17 is a flow chart depicting the seek processing according to an embodiment of the present invention.

The frequency compensation control in FIG. 4 will now be described with reference to FIG. 17. First the MCU 14 receives the seek instruction (S10). The MCU 14 computes the seek distance Lseek from the target cylinder of the seek instruction (S12). The MCU 14 judges the seek method (e.g. whether it is a long distance seek or a short distance seek) from the seek distance Lseek by the method judgment block 32.

Then the MCU 14 determines the seek waveform Wave and the seek time Tseek in the waveform time determination block 34 from the seek method (Method) and seek distance. For example, a smooth waveform, as shown in FIG. 9 and FIG. 13, or a more angular waveform is selected as the seek waveform by the seek distance, high-speed/silence mode, etc. The MCU 14 determines the representative frequency Fseek to be suppressed from the selected seek waveform and seek time, in the suppression frequency determination block 36 (S18).

The MCU 14 refers to the table 38 by the representative frequency Fseek, acquires the control constant corresponding to the frequency compensation block 24, and sets it in the frequency compensation block 24 (S20). As mentioned above, the frequency compensation block 24 suppresses around the representative frequency on the sensitivity function (FIG. 11, FIG. 15) using this control constant. For example, the frequency compensation block 24 is comprised of an inverted notch filter, and suppresses around the representative frequency on the sensitivity function by increasing the gain around the representative frequency. For example, the transfer function of the frequency compensation block 24 indicates the inverted notch filter in the following Expression (5).

$$\frac{s^2 + 2\zeta_1 \omega s + \omega^2}{s^2 + 2\zeta_2 \omega s + \omega^2} \quad (5)$$

In Expression (5), s is a Laplace operator and ω is an angular frequency.

The MCU 14 generates a target position "r" which sequentially changes during the seek time (see the positions in FIG. 5 for example) from the seek waveform Wave and the seek time Tseek in the target position generation block 44, and starts seeking (S22).

In this way, the sensitivity function, that is the frequency characteristic of the feed back loop is changed according to the seek time. Therefore the gain of the position shift component, due to the shift of the actual plant and the model of the plant, increases, and the feed back loop can control so as to suppress the position shift. In other words, dispersion of the seek time can be decreased, and an overrun or underrun can be prevented.

Second Embodiment of Seek Control System

Figures 18, 19:
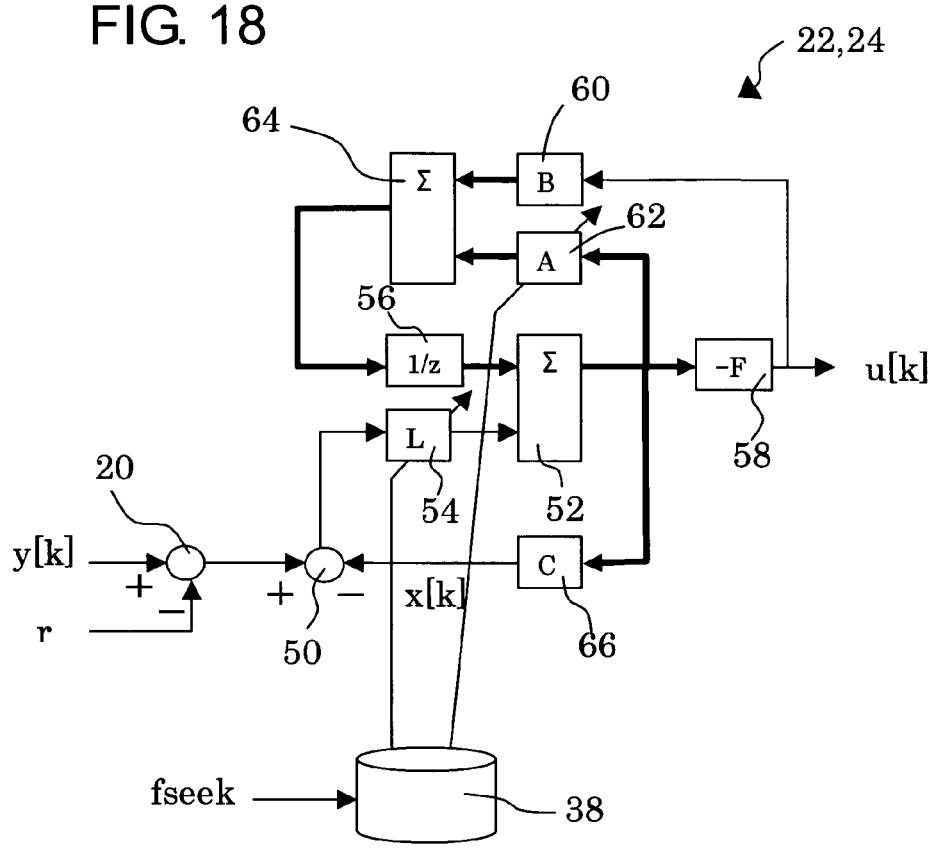
FIG. 18 is a block diagram depicting the seek control system according to the second embodiment of the present invention.
FIG. 19 shows the configuration of the estimated gain table in FIG. 18.

FIG. 18 is a block diagram depicting a position control system according to the second embodiment of the present invention, and FIG. 19 shows a constant table thereof.

The position control system in FIG. 18 is comprised of a current observer, which is an observer shown in the following Expressions (6), (7) and (8).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix}(y(k) - x(k)) \quad (6)$$

$$u(k) = -(F1 \quad F2 \quad F3 \quad F4 \quad F5)\begin{pmatrix} x(k) \\ v(k) \\ b(k) \\ z1(k) \\ z2(k) \end{pmatrix} \quad (7)$$

$$\begin{pmatrix} x(k+1) \\ v(k+1) \\ b(k+1) \\ z1(k+1) \\ z2(k+1) \end{pmatrix} = \begin{pmatrix} 1 & 1 & 1/2 & 1/2 & 0 \\ 0 & 1 & 1 & 1 & 0 \\ 0 & 0 & 1 & 0 & 0 \\ 0 & 0 & 0 & a11 & a12 \\ 0 & 0 & 0 & a21 & a22 \end{pmatrix}\begin{pmatrix} x(k) \\ v(k) \\ b(k) \\ z1(k) \\ z2(k) \end{pmatrix} + \frac{Bl}{m}\frac{1}{Lp}T^2\begin{pmatrix} 1/2 \\ 1 \\ 0 \\ 0 \\ 0 \end{pmatrix}u(k) \quad (8)$$

The configuration of FIG. 18 will be described with reference to Expressions (6), (7) and (8). As described in FIG. 4, the first computing block 20 computes the actual position error er [k] by subtracting the target position r from the observation position y [k] acquired by demodulating the above mentioned servo information read by the head 3. The second computing block 50 computes the estimated position error e [k] from the estimated position of the observer using the actual position error er [k].

This estimated position error e [k] is input to the state estimation block 54, and the estimated correction value (right hand side of Expression (6)) is computed using the estimated gain L (L1, L2, L3, L4 and L5). And the estimated correction value is added to the state quantity (left hand side of Expression (6)) from the delay block 56 in the addition block 52, and the estimated position x [k], estimated velocity v [k], estimated bias value b [k], and estimated disturbance suppression values z1 [k] and z2 [k] are acquired, as shown in Expression (6).

This estimated value is multiplied by the state feed back gain (−F) in the fourth computing block 58, and the drive value u [k] of the actuator 1 is acquired, as shown in Expression (7). On the other hand, the estimated value of Expression (6) from the addition block 56 is multiplied by the estimated gain A (5×5 matrix of Expression (8)) in the fifth computing block 62, and the drive value u [k] of the fourth computing block 58 is multiplied by the estimated gain B (value which u [k] is multiplied by in Expression (8)) in the sixth computing block 60. Both of these multiplication results are added in the addition block 64, and the estimated state quantity of the next sample of Expression (8) is acquired.

The estimated state quantity of the next sample is input to the delay block 56 and is corrected by the estimated correction value in the state estimation block 54, as described above. And for the estimated value of Expression (6) from the addition block 52, the estimated position x [k] is acquired in the seventh computing block 66, and is input to the above mentioned second computing block 50.

To provide the above mentioned frequency compensation function to this current observer, the table 38 for storing the estimated gains L and A according to the representative frequency Fseek is created as shown in FIG. 18. The table 38 stores the estimated gains L1, L2, L3, L4 and L5 and the values of the matrix A for disturbance a11, a12, a21 and a22 according to each representative frequency Freq (=Fseek). By L1, L2, L3, L4 and L5 of this table 38, L1, L2, L3, L4 and L5 of the state estimation block 54 are changed according to the representative frequency. By the matrix A for disturbance a11, a12, a21 and a22 of this table 38, a11, a12, a21 and a22 of the fifth computing block 62 (see Expression (8)) are changed according to the representative frequency.

The values of this table 38 show the change of coefficients to implement characteristics to suppress the frequency in a notch filter form, and the form of the shaping filter of the disturbance model to shape in notch filter form is changed using the estimated gain and the matrix A of the observer. In this way, the seek control system can be easily implemented by observer control.

Third Embodiment of the Seek Control System

Figure 20:
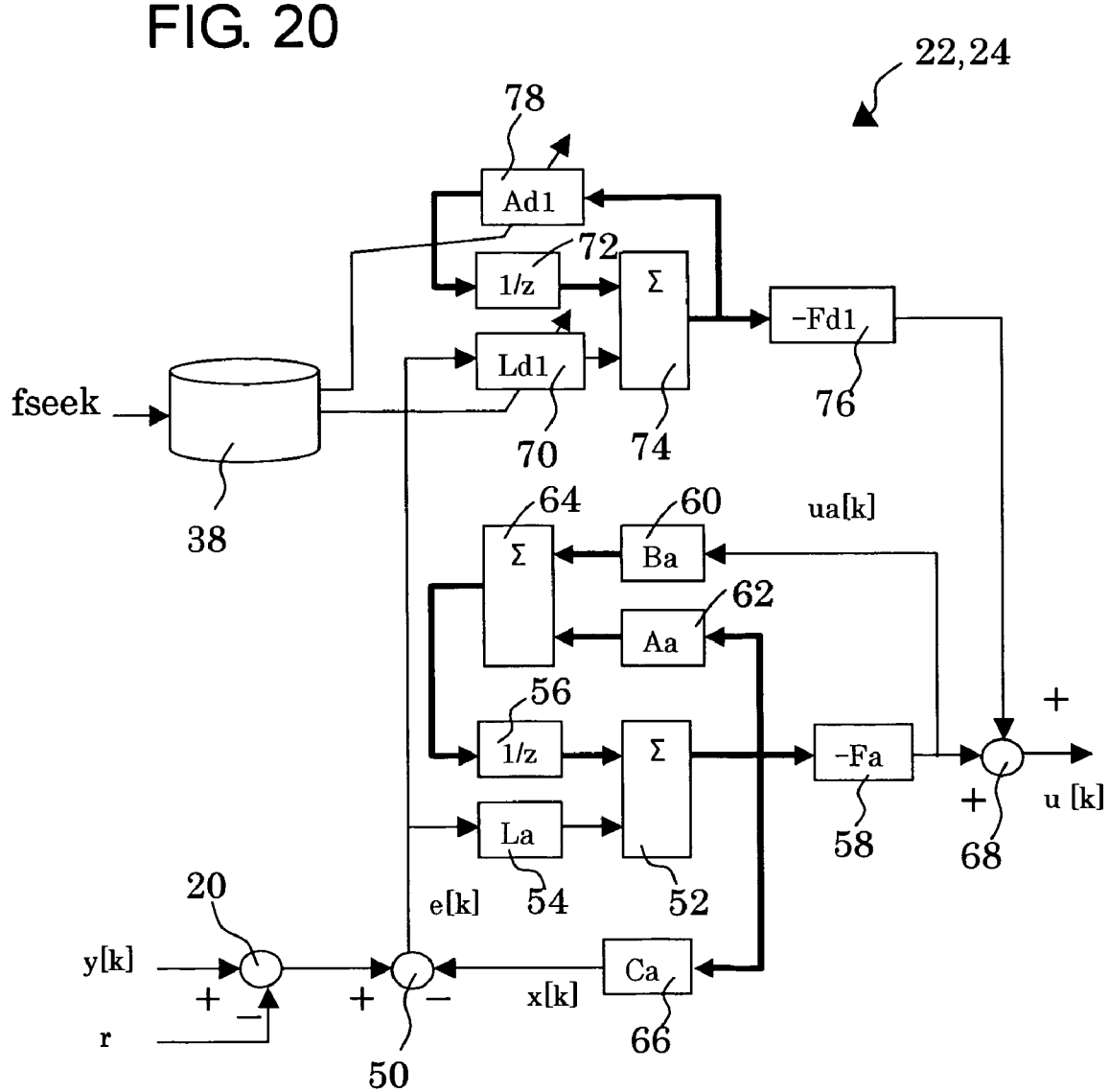
FIG. 20 is a block diagram depicting the seek control system according to the third embodiment of the present invention.

FIG. 20 is a block diagram depicting a third embodiment of the positioning control system for the MCU 14 in FIG. 1 to execute. This positioning control system is a current observer control system.

The current observer shown in FIG. 20 is an observer shown in the following Expressions (9), (10), (11) and (12).

$$\begin{pmatrix} x(k) \\ v(k) \\ b(k) \\ z1(k) \\ z2(k) \end{pmatrix} = \begin{pmatrix} x(k) \\ v(k) \\ b(k) \\ z1(k) \\ z2(k) \end{pmatrix} + \begin{pmatrix} L1 \\ L2 \\ L3 \\ L4 \\ L5 \end{pmatrix} (y(k) - x(k)) \quad (9)$$

$$u(k) = -(F1 \quad F2) \begin{pmatrix} x(k) \\ v(k) \end{pmatrix} \quad (10)$$

$$uout(k) = u(k) - (F3 \quad F4 \quad F5) \begin{pmatrix} b(k) \\ z1(k) \\ z2(k) \end{pmatrix} \quad (11)$$

$$\begin{pmatrix} x(k+1) \\ v(k+1) \end{pmatrix} = \begin{pmatrix} 1 & 1 \\ 0 & 1 \end{pmatrix} \begin{pmatrix} x(k) \\ v(k) \end{pmatrix} + \frac{Bl}{m} \frac{1}{Lp} T^2 \begin{pmatrix} 1/2 \\ 1 \end{pmatrix} u(k) \quad (12)$$

$$b(k+1) = b(k)$$

$$\begin{pmatrix} z1(k+1) \\ z2(k+1) \end{pmatrix} = \begin{pmatrix} a11 & a12 \\ a21 & a22 \end{pmatrix} \begin{pmatrix} z1(k) \\ a2(k) \end{pmatrix}$$

This embodiment is an example of an observer where the disturbance model in FIG. 18 is separated. By creating the model of the observer when the analog control system is converted into a digital control system, the configuration in which the disturbance is separated can be implemented as shown in Expressions (10), (11) and (12).

In FIG. 20, composing elements the same as FIG. 18 are denoted with the same reference symbols, and just like FIG. 18, the first computing block 20 computes the actual position error er [k] by subtracting the target position r from the observation position y [k] acquired by demodulating the servo information read by the head 3. The second computing block 50 computes the estimated position error e [k] from the estimated position x [k] of the observer using the actual position error er [k].

The estimated position error e [k] is input to the state estimation block 54, and the estimated correction value (right hand side of Expression (9)) is computed using the estimated gain La (L1, L2). And this value is added with the state quantity (left hand side of Expression (9)) from the delay block 56 in the addition block 52, and the estimated position x [k] and estimated velocity v [k] are acquired, as shown in Expression (9)).

The estimated values x [k] and v [k] are multiplied by the state feed back gain (−Fa=F1, F2) in the fourth computing block 58, and the first drive value ua [k] of the actuator 1 is acquired, as shown in Expression (10). On the other hand, the estimated value x [k] and v [k] in Expression (9) from the addition block 52 are multiplied by the estimated gain Aa (2×2 matrix A (1, 0) in Expression (12)) in the fifth computing block 62, and the drive value u [k] of the fourth computing block 58 is multiplied by the estimated gain Ba (a value which u [k] is multiplied by in Expression (12)) in the sixth computing block 60. These multiplication results are added in the addition block 64, and the estimated state quantity x [k+1] and v [k+1] of the next sample in Expression (12) are acquired.

The estimated state quantity of this next sample is input to the delay block 56, as mentioned above, and corrected by the estimated correction value in the state estimation block 54. For the estimated value of Expression (9) from the addition block 52, the estimated position x [k] is acquired in the seventh computing block 66, and is input to the above mentioned second computing block 50.

The estimated position error e [k] is input to the disturbance state estimation block 70, and the estimated correction value (right hand side of Expression (9)) is computed using the estimated gain Ld1 (L3, L4, L5). And this value is added with the state quantity (left hand side of Expression (9)) from the delay block 52 in the addition block 74, and the estimated disturbance suppression values b [k], z1 [k] and z2 [k] are acquired, as shown in Expression (9).

The estimated values b [k], z1 [k] and z2 [k] are multiplied by the state feed back gains (Fd1=F3, F4, F5) in the eighth computing block 76, and the disturbance suppression drive value of the actuator 1 is acquired, as shown in Expression (11). On the other hand, the estimated values b [k], z1 [k] and z2 [k] of Expression (9) from the addition block 74 are multiplied by the estimated gain Ad1 (gain of b [k] in Expression (12) and the gain of 2×2 matrix A) in the ninth computing block 78, and are input to the delay block 72, and the estimated values b [k+1], z1 [k+1] and z2 [k+1] of the next sample are acquired.

And in the addition block 68, the disturbance suppression drive value is subtracted from the drive value u [k], and the output drive value uout [k] of Expression (11) is acquired.

In other words, Expressions (6), (7) and (8) and Expression (9), (10), (11) and (12) are compared, and the gain indicated by the matrix in Expression (8) is separated into the controller model and disturbance model, and is developed into Expression (12), and gain F of Expression (7) is separated into the controller model and disturbance model, and developed into Expressions (10) and (11).

Expression (6) and Expression (9) have the same form, but are computed in different blocks 54 and 70 according to the developed expressions.

To provide the frequency compensation function to this separation type observer, the table 38 for storing the estimated gains Ld1 and Ad1 according to the representative frequency Fseek is created. As FIG. 19 shows, the table 38 stores the values L3, L4 and L5 and a11, a12, a21 and a22 according to the value of each representative frequency. By L3, L4 and L5 of this table, L3, L4 and L5 of the state estimation block 70 are changed according to the representative frequency. By a11, a12, a21 and a22 of this table 38, a11, a12, a21 and a22 of the computing block 78 (see Expression (12)) are changed according to the representative frequency.

In this example as well, the frequency characteristic of the disturbance model for shaping in a notch filter form can be changed by changing the estimated gain of the observer, just like the case of FIG. 18.

Fourth Embodiment of the Seek Control System

Figure 21:
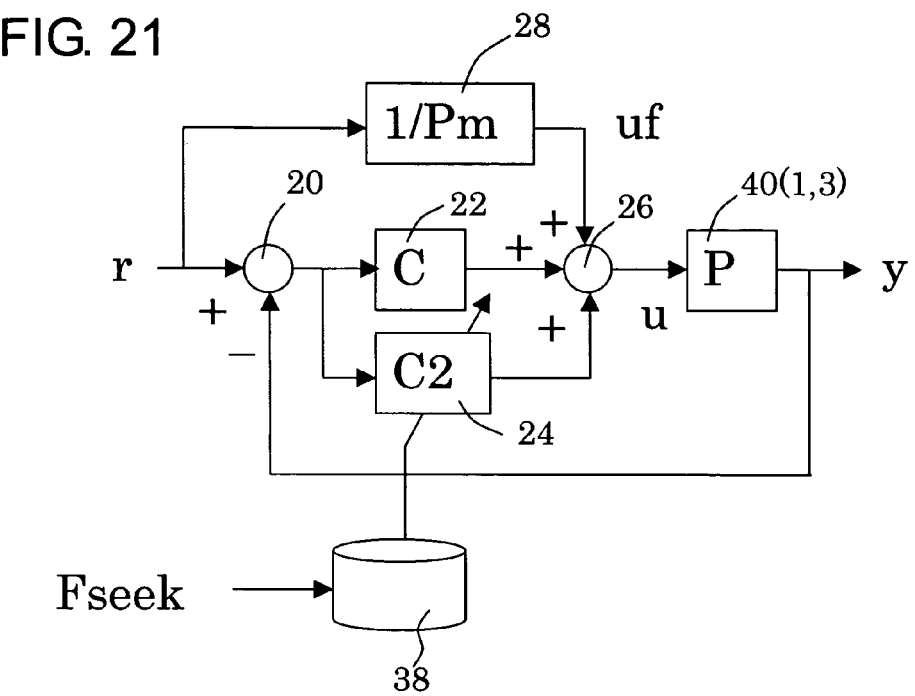
FIG. 21 is a block diagram depicting the seek control system according to the fourth embodiment of the present invention.

FIG. 21 is a block diagram depicting a fourth embodiment of the positioning control system for the MCU 14 in FIG. 1 to execute. This positioning control system is a feed back control loop of the two-degree of freedom control system where a compensator 24 for changing the frequency characteristic of a specific frequency according to the seek distance is installed in parallel.

As FIG. 21 shows, the plant 40 (head 3 and actuator 1 in FIG. 1), which is a control target, is moved to the target position "r" in seek control. The trajectory creation block 28 creates a position trajectory or velocity trajectory or an acceleration trajectory "uf" from the target position "r", and outputs it to the computing block 26.

In the feed back loop system, the computing block 20 computes the position error between the position "y" of the plant 40 and the target position "r", and the controller 22 computes the control amount so as to decrease the position error from the position error. The frequency compensation block 24 can change the frequency characteristic from the outside, and suppresses a specific frequency on the sensitivity function. The computing block 26 adds the output of the frequency compensation block 24 and the output of the controller 22 with the seek trajectory uf, and drives the plant 40 using the added value u.

The control constant of the frequency compensation block 24 is changed according to the seek time, using the values in the table 38 which is referred to by the representative frequency Fseek. The frequency compensation block 24 has a transfer function shown in Expression (13), for example. In Expression (13), s is a Laplace operator, and ω is a central frequency. a and b in Expression (13) are changed by the values in the table 38 so that the sensitivity function or acceleration disturbance characteristic is suppressed at the central frequency.

$$\frac{as+b}{s^2 + 2\zeta_2 \omega s + \omega^2} \quad (13)$$

With the configuration connecting the frequency compensation block 24 in parallel as well, this sensitivity function, that is the frequency characteristic of the feed back loop, can be changed according to the seek time, just like FIG. 4. Therefore the gain of the position shift component due to the shift of the actual plant and the model of the plant increases, and the feed back loop can control so as to suppress the position shift. In other words, the dispersion of the seek time can be decreased, and an overrun or underrun can be prevented.

Fifth Embodiment of Seek Control System

Figure 22:
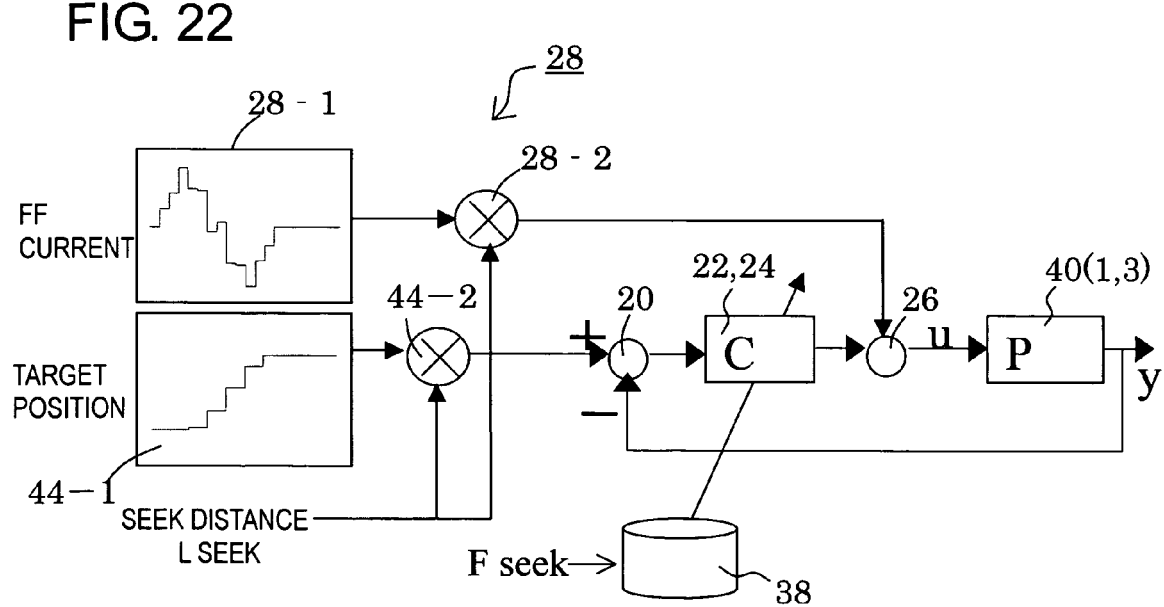
FIG. 22 is a block diagram depicting the seek control system according to the fifth embodiment of the present invention.

FIG. 22 is a block diagram depicting a fifth embodiment of the positioning control system for the MCU 14 in FIG. 1 to execute. This positioning control system is a feed back control loop of the two-degree of freedom control system where a compensator 24 for changing the frequency characteristic of a specific frequency according to the seek distance is installed.

Also when a trajectory current uf is created from the target position "r" in the trajectory creation block 28 of the characteristic (1/Pm) in the two-degree of freedom control, the feed forward control is used to implement the block of this characteristic.

In FIG. 22, composing elements the same as those in FIG. 4 and FIG. 21 are denoted with the same reference symbols, and in the same way, the trajectory creation block 28 for moving the plant 40 (head 3 and actuator 1 in FIG. 1), which is a control target, to the target position "r" in seek control has a feed forward current generation block 28-1, and a multiplication block 28-2 for generating the feed forward current for the amount of seek distance by multiplying the feed forward current in unit distance generated by the current generation block 28-1, by the seek distance Lseek.

In the same way, the target position generation block 44 has a position trajectory generation block 44-1 for generating the position trajectory in unit distance, and a multiplication block 44-2 for generating the position trajectory for the amount of seek distance by multiplying the position trajectory in unit distance, generated by the position trajectory generation block 44-1, by the seek distance Lseek.

In the feed back loop system, the computing block 20 computes the position error between the position "y" of the plant 40 and the target position trajectory, and the controller 22 computes the control amount so as to decrease the position error from the position error. The frequency compensation block 24 can change the frequency characteristic from the outside, and suppresses a specific frequency on the sensitivity function. The computing block 26 adds the output of the frequency compensation block 24 and the seek trajectory (feed forward current) uf, and drives the plant 40 using the added value u.

Just like FIG. 4 and FIG. 21, the control constant of the frequency compensation block 24 is changed according to the seek time, using the value in the table 38, which is referred to by the representative frequency Fseek.

In this way, if feed forward is used, the seek control system can be easily implemented, and just like FIG. 4, the sensitivity function, that is the frequency characteristic of the feed back loop, can be changed according to the seek time. Therefore the gain of the position shift component due to the shift of the actual plant and the model of the plant increases, and the feed back loop can control so as to suppress the position shift. In other words, the dispersion of the seek time can be decreased, and an overrun or underrun can be prevented.

Sixth Embodiment of Seek Control System

Figure 23:
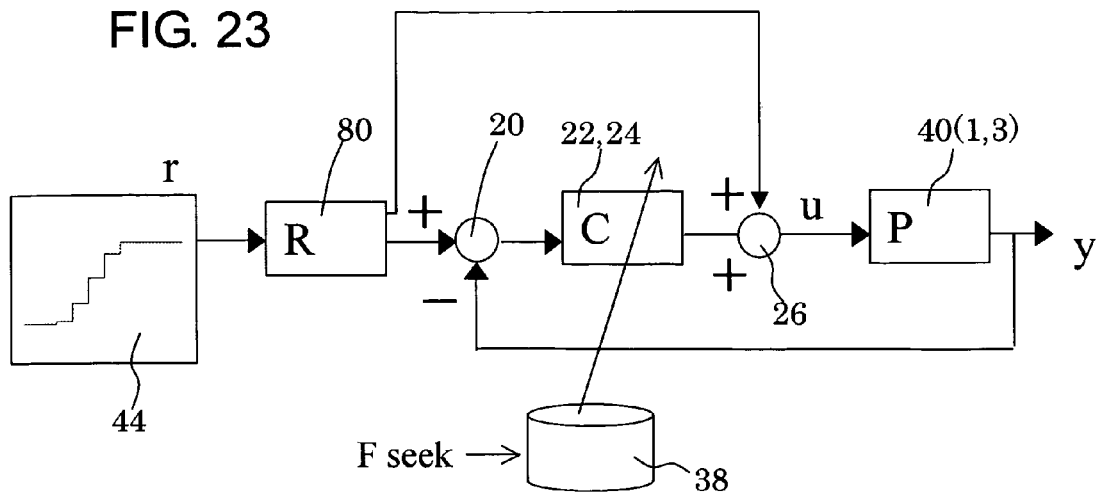
FIG. 23 is a block diagram depicting the seek control system according to the sixth embodiment of the present invention.
Figure 24:
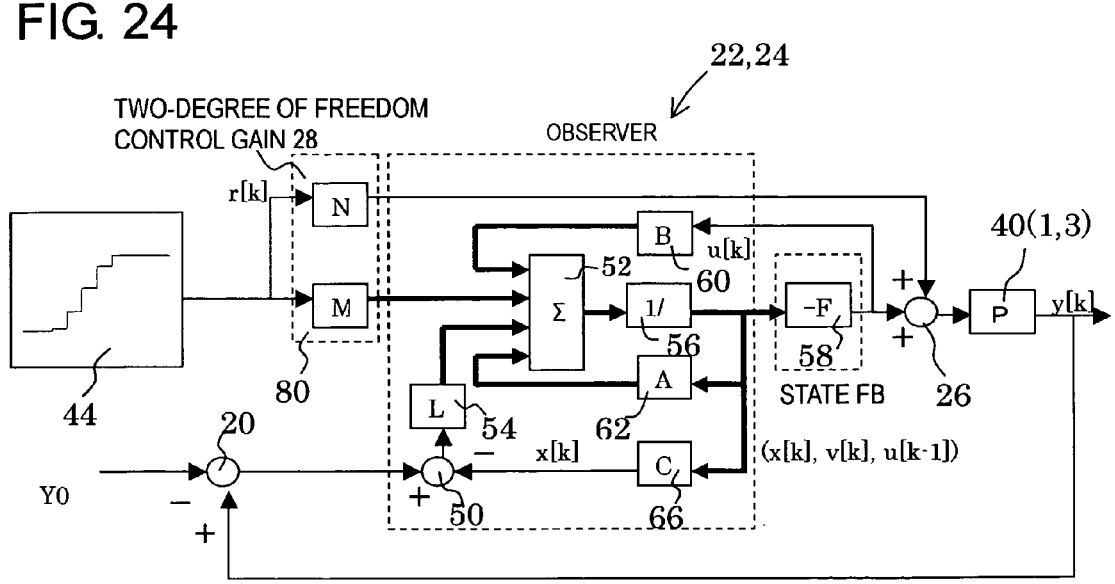
FIG. 24 is a block diagram depicting the seek control system in FIG. 23 implemented by observer control.
Figure 25:
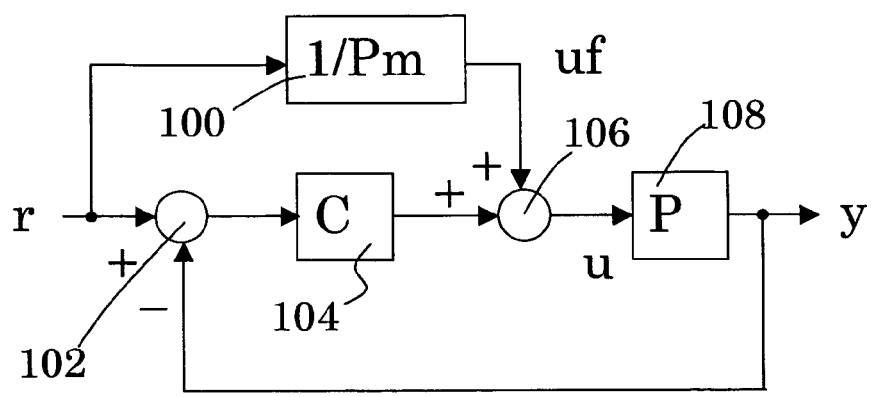
FIG. 25 is a diagram depicting a conventional seek control system.

FIG. 23 is a block diagram depicting a sixth embodiment of the positioning control system for the MCU 14 in FIG. 1 to execute, and FIG. 24 is a block diagram depicting the configuration in FIG. 23 implemented by an observer. This positioning control system is a feed back control loop of the two-degree of freedom control system where a compensator 24 for changing the frequency characteristic of a specific frequency according to the seek distance is installed.

Also when a trajectory current uf is created from the target position "r" in the trajectory creation block 28 of the characteristic (1/Pm) in the two-degree of freedom control, the two-degree of freedom shaping filter is used to implement the block of this characteristic.

In FIG. 23, composing elements the same as those in FIG. 4, FIG. 21 and FIG. 22 are denoted with the same reference symbols, and in the same way, the trajectory creation block 28 for moving the plant 40 (head 3 and actuator 1 in FIG. 1), which is a control target, to the target position "r" in seek control has a shaping filter 80 for generating the acceleration trajectory uf by providing more tolerance to the target position r from the target position generation block 44.

In the feed back loop system, the computing block 20 computes the position error between the position "y" of the plant 40 and the target position trajectory, and the controller 22 computes the control amount to decrease the position error from the position error. The frequency compensation block 24 can change the frequency characteristic from the outside, and suppresses a specific frequency on the sensitivity function. The computing block 26 adds the output of the frequency compensation block 24 and the seek trajectory current uf, and drives the plant 40 using the added value u.

Just like FIG. 4 and FIG. 21, the control constant of the frequency compensation block 24 is changed according to the seek time, using the value in the table 38 which is referred to by the representative frequency Fseek.

FIG. 24 is a block diagram when the configuration in FIG. 23 is implemented by a forecasting observer, where composing elements the same as those in FIG. 23 and FIG. 18 are denoted with the same reference symbols. The controller 22 and the frequency compensation block 24 constitute the observer, and the configuration is roughly the same as FIG. 18. However, since FIG. 24 is a forecasting observer, unlike the current observer in FIG. 18, the delay block 56 delays the output of the addition block 52 and inputs it to the state feed back block 58.

The two-degree of freedom control system 28 is comprised of a control gain multiplication block, and multiplies the target position trajectory r [k] of the target position generation block 44 by the trajectory creation gain N, outputs the trajectory current uf to the addition block 26, and multiplies the target position trajectory r [k] by the position gain M, and inputs it to the addition blocks 52 of the observer 22 and 24.

Although not illustrated, a table 38, which is referred to by the representative frequency Fseek, is included just like FIG. 18, and L3 to L5 of the state estimation block 54 of the observer and matrix A of the state feed back block 62 are changed according to the seek time.

In this way, if two-degree of freedom control by the observer is used, the seek control system can be easily implemented, and just like FIG. 4, the sensitivity function, that is the frequency characteristic of the feed back loop, can be changed according to the seek time. Therefore the gain of the position shift component, due to the shift of the actual plant and the model of the plant, increases, and the feed back loop can control so as to suppress the position shift. In other words, the dispersion of the seek time can be decreased, and an overrun or underrun can be prevented.

Other Embodiments

In the above embodiments, the seek control was described using an example of applying it to the head positioning device of the magnetic disk device, but the present invention can also be applied to other disk devices, such as optical disk device and motion control devices. The controller can be not only observer control, but by PID (Proportional Integrated Differential) control or Leadlag control.

The present invention was described using embodiment, but the present invention can be modified in various ways within the scope of the essential character thereof, and these variant forms shall not be excluded from the scope of the present invention.

When seek control is performed by providing a seek trajectory, the frequency characteristic of a feed back loop is changed according to the seek time, so the gain of the position shift component, due to the shift of the actual plant and the model of the plant, increases, and the feed back loop can control so as to suppress the position shift. In other words, dispersion of the seek time can be decreased, and an overrun or underrun can be prevented.

What is claimed is:

1. A seek control method for seeking an object from a current position to a target position by an actuator, comprising the steps of:
   creating a seek trajectory signal according to said target position;
   creating a feedback control signal of said actuator from a position error between the current position of said object and said target position by a feedback loop;
   driving said actuator by said seek trajectory signal and said feedback control signal;
   determining a representative frequency to be suppressed at least according to seek time from said current position to said target position; and
   changing frequency characteristic of said feedback loop so as to suppress said representative frequency,
   wherein said determining step comprises a step of determining representative frequency to be suppressed from said seek time and a seek waveform of said seek trajectory signal, and a step of determining a frequency with which the power spectrum of said seek waveform becomes a maximum as said representative frequency.

2. The seek control method according to claim 1, wherein said changing step comprises a step of changing frequency characteristic of said feed back loop so that said representative frequency is suppressed on a sensitivity function of said feed back loop.

3. The seek control method according to claim 1, wherein said step of creating the seek trajectory signal comprises a step of supplying said seek trajectory signal by feed forward control.

4. A seek control method for seeking an object from a current position to a target position by an actuator, comprising the steps of:
   creating a seek trajectory signal according to said target position;
   creating a feedback control signal of said actuator from a position error between the current position of said object and said target position by a feedback loop;
   driving said actuator by said seek trajectory signal and said feedback control signal;
   determining a representative frequency to be suppressed at least according to seek time from said current position to said target position; and
   changing frequency characteristic of said feedback loop so as to suppress said representative frequency,
   wherein said creating step comprises a step of creating a feedback control signal of said actuator by observer control,
   and wherein said changing step further comprises a step of changing a disturbance estimation gain for said observer control according to said representative frequency.

5. The seek control method according to claim 4, wherein said changing step comprises a step of changing frequency characteristic of said feedback loop so that said representative frequency is suppressed on a sensitivity function of said feedback loop.

6. The seek control method according to claim 4, wherein said step of creating the seek trajectory signal comprises a step of supplying said seek trajectory signal by feed forward control.

7. A seek control device for seeking an object from a current position to a target position by an actuator, comprising:
- a trajectory block for supplying a seek trajectory signal according to said target position,
- a feedback loop for generating a feedback control signal of said actuator from position error between a current position of said object and said target position;
- a compute block for computing a drive value of said actuator by said seek trajectory signal and said feedback control signal; and
- a change block for determining a representative frequency to be suppressed at least according to the seek time from said current position to said target position, and changing the frequency characteristic of said feedback loop so as to suppress said representative frequency,
- wherein said change block determines the representative frequency to be suppressed from said seek time and a seek waveform of said seek trajectory signal,
- and wherein said change block determines a frequency with which the power spectrum of said seek waveform becomes the maximum as said representative frequency.

8. The seek control device according to claim 7, wherein said change block changes the frequency characteristic of said feed back loop so that said representative frequency is suppressed on a sensitivity function of said feed back loop.

9. The seek control device according to claim 7, wherein said compute block supplies said seek trajectory signal by feed forward control.

10. A seek control device for seeking an object from a current position to a target position by an actuator, comprising:
- a trajectory block for supplying a seek trajectory signal according to said target position,
- a feedback loop for generating a feedback control signal of said actuator from position error between a current position of said object and said target position;
- a compute block for computing a drive value of said actuator by said seek trajectory signal and said feedback control signal; and
- a change block for determining a representative frequency to be suppressed at least according to the seek time from said current position to said target position, and changing the frequency characteristic of said feedback loop so as to suppress said representative frequency,
- wherein said feedback loop comprises an observer control system, and
- wherein said change block changes a disturbance estimation gain for said observer control according to said representative frequency.

11. The seek control device according to claim 10, wherein said change block changes the frequency characteristic of said feedback loop so that said representative frequency is suppressed on a sensitivity function of said feedback loop.

12. The seek control device according to claim 10, wherein said compute block supplies said seek trajectory signal by feed forward control.

13. A disk device comprising:
- a head for at least reading data on a disk storage medium;
- an actuator for positioning said head to a predetermined position on said disk storage medium; and
- a control unit which comprises:
- a supply block for supplying a seek trajectory signal according to said target position;
- a feedback loop for generating a feedback control signal of said actuator from the position error between the current position of said object and said target position; and
- a compute block for computing a drive value of said actuator from said seek trajectory signal and said feedback control signal,
- wherein said control unit determines a representative frequency to be suppressed at least according to the seek time from said current position to said target position, and changes the frequency characteristic of said feedback loop so as to suppress said representative frequency,
- wherein said control unit determines the representative frequency to be suppressed from said seek time and a seek waveform of said seek trajectory signal, and
- wherein said control unit determines a frequency with which the power spectrum of said seek waveform becomes the maximum as said representative frequency.

14. The disk device according to claim 13, wherein said control unit changes the frequency characteristic of said feed back loop so that said representative frequency is suppressed on a sensitivity function of said feed back loop.

15. The disk device according to claim 13, wherein said control unit supplies said seek trajectory signal by feed forward control.

16. A disk device comprising:
- a head for at least reading data on a disk storage medium;
- an actuator for positioning said head to a predetermined position on said disk storage medium; and
- a control unit which comprises:
- a supply block for supplying a seek trajectory signal according to said target position;
- a feedback loop for generating a feedback control signal of said actuator from the position error between the current position of said object and said target position; and
- a compute block for computing a drive value of said actuator from said seek trajectory signal and said feedback control signal,
- wherein said control unit determines a representative frequency to be suppressed at least according to the seek time from said current position to said target position, and changes the frequency characteristic of said feedback loop so as to suppress said representative frequency,
- wherein said feedback loop comprises an observer control system, and
- wherein said control unit changes a disturbance estimation gain for said observer control according to said representative frequency.

* * * * *